United States Patent
Sarkar et al.

(10) Patent No.: US 10,893,420 B2
(45) Date of Patent: Jan. 12, 2021

(54) SYSTEM AND METHOD OF AUTOMATIC PHYSICAL CELL ID ALLOCATION TO REDUCE COLLISION

(71) Applicant: TELEFONAKTIEBOLAGET LM ERICSSON (PUBL), Stockholm (SE)

(72) Inventors: Debasish Sarkar, Frisco, TX (US); Surajit Mondal, Gurgaon (IN); Ayan Sen, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 16/134,669

(22) Filed: Sep. 18, 2018

(65) Prior Publication Data

US 2019/0261198 A1    Aug. 22, 2019

Related U.S. Application Data

(60) Provisional application No. 62/710,323, filed on Feb. 16, 2018.

(51) Int. Cl.
| | |
|---|---|
| H04W 24/02 | (2009.01) |
| G06F 9/455 | (2018.01) |
| H04W 16/18 | (2009.01) |
| H04W 36/08 | (2009.01) |
| H04W 48/20 | (2009.01) |
| H04W 36/00 | (2009.01) |
| H04J 11/00 | (2006.01) |
| H04W 76/11 | (2018.01) |
| H04W 16/10 | (2009.01) |

(52) U.S. Cl.
CPC ........ H04W 24/02 (2013.01); G06F 9/45558 (2013.01); H04W 16/18 (2013.01); H04W 36/08 (2013.01); H04W 48/20 (2013.01); *G06F 2009/45595* (2013.01); *H04J 11/0069* (2013.01); *H04W 16/10* (2013.01); *H04W 36/0083* (2013.01); *H04W 76/11* (2018.02)

(58) Field of Classification Search
None
See application file for complete search history.

(56) References Cited

U.S. PATENT DOCUMENTS

| | | |
|---|---|---|
| 9,894,659 B1 | 2/2018 | Wang et al. |
| 2015/0245221 A1 | 8/2015 | Yiu et al. |
| 2018/0035478 A1 | 2/2018 | Chaudhuri et al. |

FOREIGN PATENT DOCUMENTS

WO    2016154604 A1    9/2016

*Primary Examiner* — Chi H Pham
*Assistant Examiner* — Raul Rivas
(74) *Attorney, Agent, or Firm* — Sage Patent Group

(57) ABSTRACT

A management node and method at the management node provide automatic PCI allocation to sites in a RAN by iteratively identifying a selected cell site to be allocated a PCI group. From a group of cell sites in the RAN that have already been allocated a PCI group, the method obtains, for each PCI group, a closest neighbor site having a least distance from the selected cell site. The method allocates a PCI associated with a closest neighbor site based on whether any of the closest neighbor sites meet criteria including, with respect to the selected cell site, a respective distance greater than a cluster distance, a lack of coverage overlap between any respective sectors, a tier relationship that is two or greater and a respective distance greater than an average cell footprint, and a lack of sectors that face any sectors of the given cell site.

21 Claims, 20 Drawing Sheets

3 SECTOR SITE WITH 4 CARRIERS PER CELL

SECTOR 0

LEGEND

400

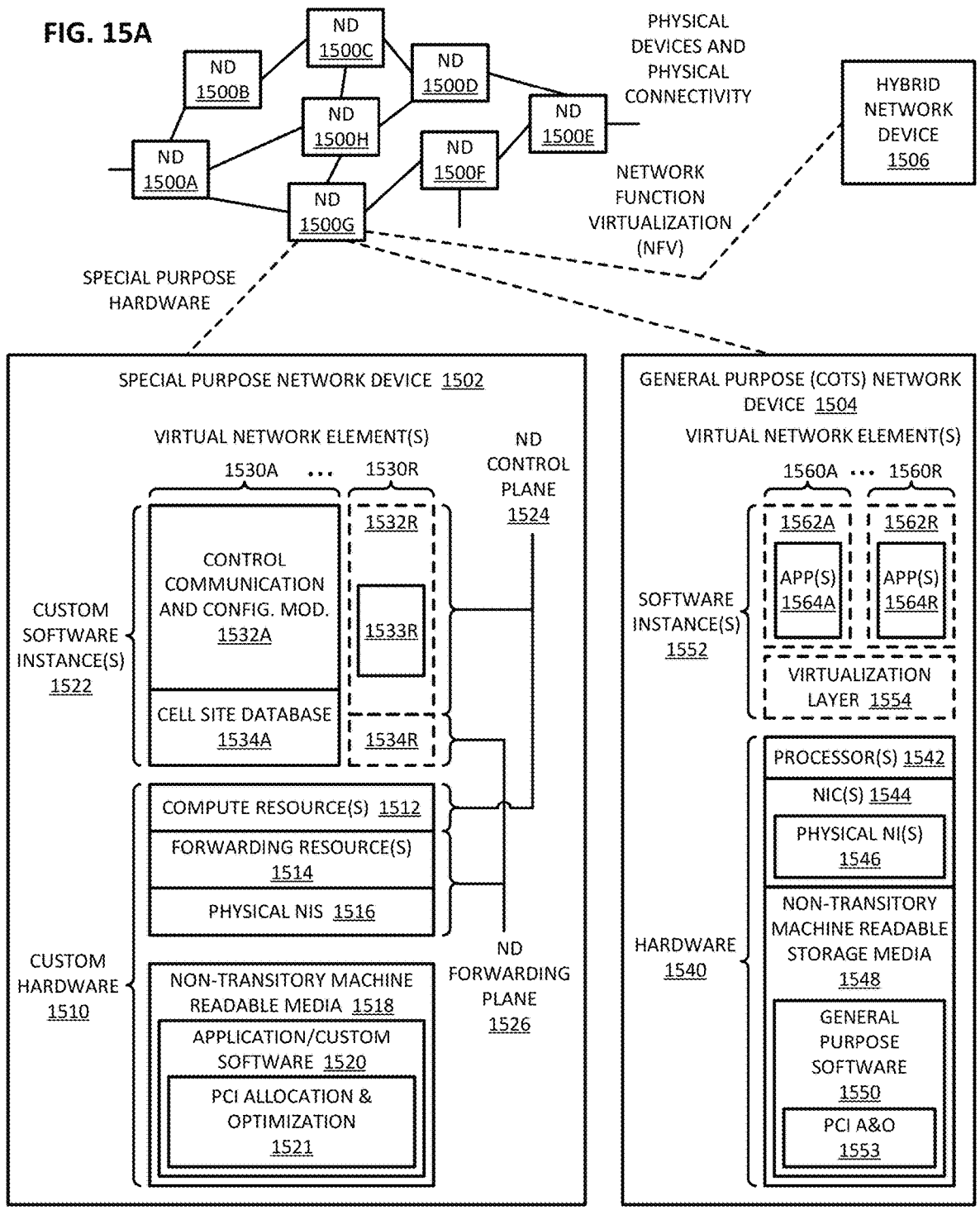
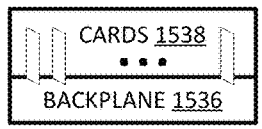

SYSTEM AND METHOD OF AUTOMATIC PHYSICAL CELL ID ALLOCATION TO REDUCE COLLISION

PRIORITY UNDER 35 U.S.C. § 119(e) & 37 C.F.R. § 1.78

This non-provisional application claims priority based upon the following prior United States provisional patent application(s): (i) "SYSTEM AND METHOD OF AUTOMATIC PHYSICAL CELL ID ALLOCATION TO REDUCE COLLISION," Application No. 62/710,323, filed Feb. 16, 2018, in the name(s) of Debasish Sarkar, Surajit Mondal and Ayan Sen, which is hereby incorporated by reference in its entirety.

TECHNICAL FIELD

The present disclosure generally relates to communications networks. More particularly, and not by way of any limitation, the present disclosure is directed to a system and method of automatic physical cell ID (PCI) allocation to reduce collision.

BACKGROUND

Each base station in a radio access network (RAN) has two separate cell identifiers: a global cell ID (GCI) that uniquely identifies the cell in the worldwide system and the physical cell ID that is utilized for the separation of different transmitters. Networks in 4G are limited to 504 PCIs, which mandates that the PCI must be carefully assigned to avoid neighboring cells that utilize the same PCI. Networks in 5G are even further limited, with only 21 PCI being assigned, requiring extensive reuse. Additionally, while a PCI in 4G is assigned to a sector regardless of the number of carriers, i.e., the amount of spectrum provided by the sector, a PCI in 5G is allocated for each 100 MHz carrier used by the cell.

With the deployment of 5G networks and the steady growth in mobile usage, the required higher network capacity implies denser networks. For these denser networks to work correctly, the network structure needs to be well-planned so that each unit, e.g., a base station such as a New Radio gNB or eNodeB, has access to a fair share of the available network capacity. Given the limited number of PC's and the need to extensively reuse each PCI, the assignment of PCIs is one of the planning problems that must be addressed. Since multiple cells across the network share the same PCI, collision or conflict may occur if PCIs are poorly allocated and reused. New assignment strategies for PCIs need to be designed.

SUMMARY

The present patent disclosure is broadly directed to a method, network node and computer program for allocation and optimization of suitable PCIs across a network based on cell coverage overlap, as well as a user equipment (UE) that is operable to send and receive signals that are based on a PCI that has been allocated by the disclosed method. The disclosed method operates to minimize PCI collisions and to remove the possibility of PCI collision to the extent possible. When the disclosed method is unable to identify a PCI that provides no conflict, the method prioritizes PCI allocation in a pre-defined sequence of criteria. An example list of an applied sequence of criteria includes but is not limited to:

Based on cell coverage overlap;
Based on a second tier or greater relationship;
Based on relative-bearing; and
Based on distance.

In one aspect, an embodiment of a method operating at a management node for automatic physical cell ID allocation to a plurality of cell sites in a radio access network is disclosed. The claimed method comprises, inter alia, identifying a selected cell site of the plurality of cell sites, the selected cell site to be allocated a PCI group; from a group of cell sites in the RAN that have already been assigned a respective PCI group, identifying, for each PCI group, a closest neighbor site assigned to the respective PCI group and providing, for the closest neighbor site a respective distance from the selected cell site, a respective tier relationship to the selected cell site, and respective relative bearings between the selected cell site and the respective closest neighbor site; determining whether any of the respective closest neighbor sites meets a first criterion of having a respective distance greater than a cluster distance and allocating the respective PCI group of a first respective closest neighbor site that meets the first criterion to the selected cell site; and if none of the respective closest neighbor sites meet the first criterion, determining whether any of the respective closest neighbor sites meet a second criterion of a lack of coverage overlap between any respective sectors of the selected cell site and respective sectors of the respective closest neighbor site and if the second criterion is met, allocating the respective PCI group of the respective closest neighbor site that meets the second criterion to the selected cell site in order to improve throughput in the RAN and decrease the possibility of dropped calls.

In a further aspect, an embodiment of a non-transitory machine-readable storage medium is disclosed. The storage medium has program instructions thereon, which are configured to perform acts that when executed by one or more processors associated with a network, perform allocation and optimization of physical cell ID groups to cell sites in a radio access node using an iterative method that determines, for each given cell site in turn, a group comprising a closest neighbor cell site corresponding to each of a plurality of PCI groups that can be allocated to the given cell site, the iterative method determining whether any of the group of closest neighbor cell sites meet one of the criteria selected from a group of criteria comprising the respective closest neighbor cell site (a) is farther from the given cell site than a cluster distance, (b) does not have any coverage overlap with the given cell site, (c) has a tier relationship with the given cell site that is two or greater and is also farther from the given cell site than an average cell footprint, and (d) does not have any sectors that face any sectors of the given cell site, the iterative method allocating to the given cell site a respective PCI group of a first selected closest neighbor cell site that meets a first criterion and if no closest neighbor cell site meets any of the criteria, allocating to the given cell site a respective PCI group of a second closest neighbor cell site that is farthest from the given cell site.

In a still further aspect, an embodiment of user equipment (UE) is disclosed. The UE comprises, inter alia, a processor; a transceiver coupled to the processor; a memory that comprises a cell synchronization module, a reference signal location module and a communications module that when collectively performed by the processor, receive a physical downlink shared channel from a given cell site, determine a physical cell ID (PCI) from the physical downlink shared channel and utilizes the PCI to determine the location of reference signals utilized in cell selection, cell reselection and handover procedures, wherein allocation and optimization of the PCI has been performed using an iterative method that determines a group comprising a closest neighbor cell site for each of a plurality of PCI groups that can be allocated to the given cell site, the iterative method determining whether any of the group of closest neighbor cell sites meet one of the criteria comprising the closest neighbor cell site (a) is farther from the given cell site than a cluster distance, (b) does not have any coverage overlap with the given cell site, (c) has a tier relationship with the given cell site that is two or greater and is also farther from the given cell site than an average cell footprint, and (d) does not have any sectors that face any sectors of the given cell site, the iterative method allocating to the given cell site a respective PCI group of the closest neighbor cell site that meets a first criterion and if no closest neighbor cell site meets any of the criteria, allocating to the given cell site a respective PCI group of the closest neighbor cell site that is farthest from the given cell site.

In a still further aspect, an embodiment of an apparatus configured as a network node for automatic physical cell ID (PCI) allocation to a plurality of cell sites in a radio access network (RAN) is disclosed. The apparatus comprises, inter alia, one or more processors; one or more persistent memory modules having program instructions stored thereon which, when executed by the one or more processors, perform the following: identifying a selected cell site of the plurality of cell sites, the selected cell site to be allocated a PCI group; from a group of cell sites in the RAN that have already been allocated a respective PCI group, identifying, for each PCI group, a closest neighbor site allocated to the respective PCI group and providing, for the closest neighbor site a respective distance from the selected cell site, a respective tier relationship to the selected cell site, and respective relative bearings between the selected cell site and the respective closest neighbor site; determining whether any of the respective closest neighbor sites meets a first criterion of having a respective distance greater than a cluster distance and allocating the respective PCI group of a first respective closest neighbor site that meets the first criterion to the selected cell site; and if none of the respective closest neighbor sites meet the first criterion, determining whether any of the respective closest neighbor sites meet a second criterion of a lack of coverage overlap between any respective sectors of the selected cell site and respective sectors of the respective closest neighbor site and if the second criterion is met, allocating the respective PCI group of the respective closest neighbor site that meets the second criterion to the selected cell site in order to improve throughput in the RAN and decrease the possibility of dropped calls.

Example embodiments set forth herein advantageously provide an efficient and intelligent method of PCI allocation and optimization. The disclosed method takes into consideration the constraints of 5G deployment and reduces the probability of PCI conflict that can result in poor downlink (DL) Signal to Noise Ratio (SINR) and poor user perception of throughput. Example embodiments can reduce instances of conflict occurring in the network that may lead to loss of connection. The reduction in conflict may also provide higher throughput in the network, minimal dropped calls and an enhanced end customer experience. Unlike legacy Long Term Evolution (LTE), for uplink (UL) carrier aggregation in 5G, different carriers need to be allocated with different PCI for same sector to avoid high UL peak-to-average power ratio (PAPR) on the UE side owing to large bandwidth (of the order of 100 MHz or more). The described method accommodates this possibility. Additional benefits and advantages of the embodiments will be apparent in view of the following description and accompanying figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 15A-15B depict connectivity between network devices (NDs) of an exemplary OSS and/or associated multi-domain network, as well as three exemplary implementations of the NDs, according to some embodiments of the present invention.

DETAILED DESCRIPTION

Figure 1:
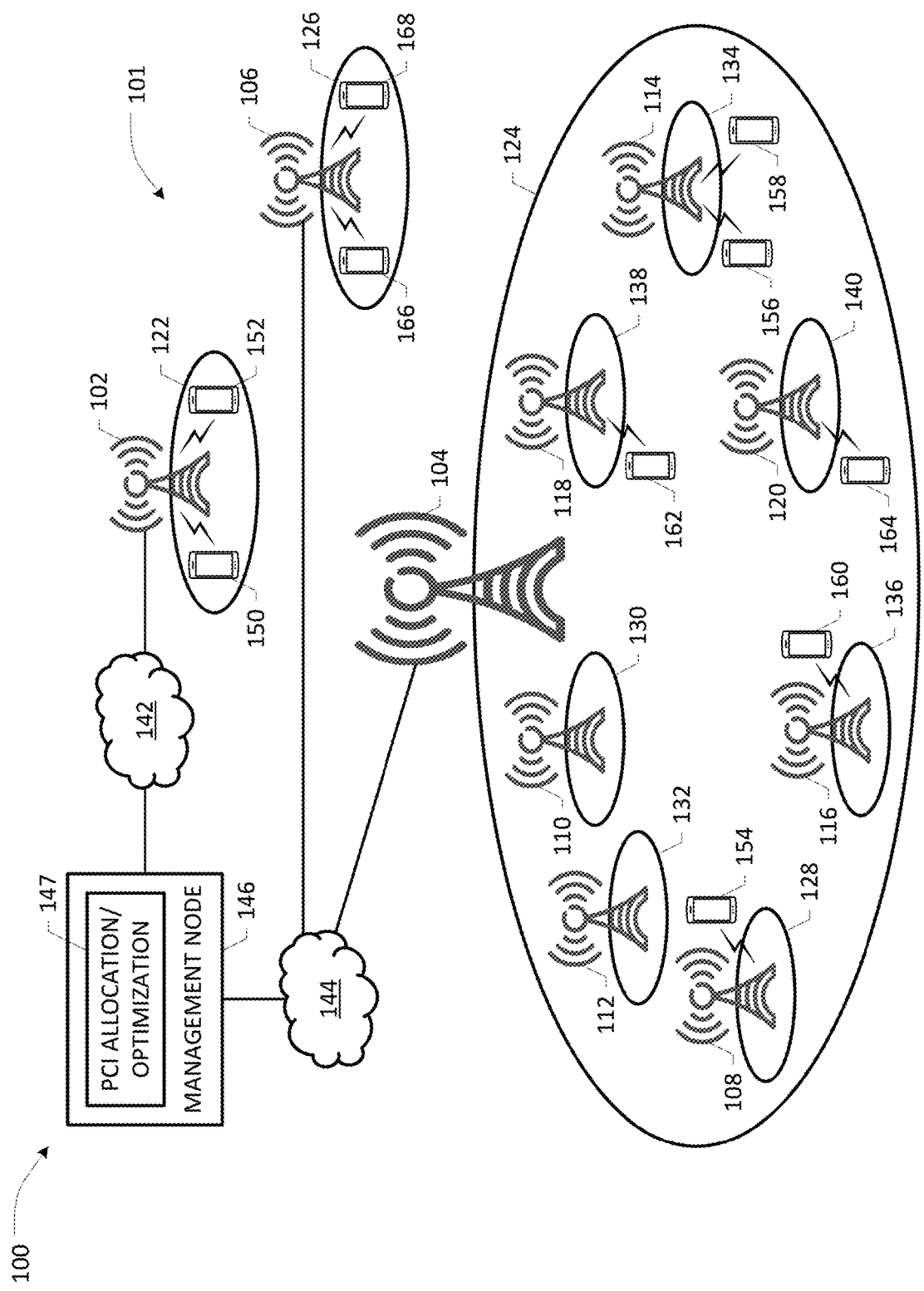
FIG. 1 depicts an example network environment in which the application is implemented.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network node or element (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). Subscriber/tenant end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) may access or consume resources/services, including cloud-centric resources/services, provided over a multi-domain, multi-operator heterogeneous network environment, including, e.g., a packet-switched wide area public network such as the Internet via suitable service provider access networks, wherein a network may be configured according to one or more embodiments set forth herein below. Subscriber/tenant end stations may also access or consume resources/services provided on virtual private networks (VPNs) overlaid on (e.g., tunneled through) the Internet. Typically, subscriber/tenant end stations may be coupled (e.g., through customer/tenant premise equipment or CPE/TPE coupled to an access network (wired or wirelessly)) to edge network elements, which are coupled (e.g., through one or more core network elements) to other edge network elements, and to cloud-based data center elements with respect to consuming hosted resources/services according to service management agreements, contracts, etc.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element and/or a management node, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

The discussion below provides specific example embodiments in which specific features are provided, e.g., number of sectors comprising a cell, number of carriers per cell, specific PCI values, number of PCI values, etc. These examples are meant to be illustrative only and do not limit the disclosed inventive concepts in any way.

Traditional cellular communications networks are homogeneous networks, e.g., a 4G network includes base stations (i.e., eNodeBs) in a planned single-layer layout in which all base stations have similar, or the same, transmit power levels, antenna patterns, receiver noise floors, and backhaul connectivity to the data, or core, network. Moreover, all base stations offer unrestricted access to user terminals in the network, and serve roughly the same number of user terminals. Some examples of cellular communications networks that traditionally have utilized homogeneous network layouts include, for example, Global System for Mobile communications (GSM) networks, Wideband Code Division Multiple Access (WCDMA) networks, High Speed Downlink Packet Access (HSDPA) networks, LTE networks, WiMax networks, etc. Networks in 5G, however, are moving towards far more heterogeneous networks, with multiple layers of access networks and backhaul connections that can be either wired or wireless.

FIG. 1 depicts a network 100 in which an embodiment of the disclosure is implemented. A RAN 101 in network 100 includes a number of macro, or high-power, base stations in a planned layout and a number of low-power base stations. Although only three macro cells are illustrated in network 100, the network 100 typically includes numerous macro cells. As illustrated, the network 100 includes macro, or high-power, base stations 102, 104, 106 serving macro cells 122, 124, 126 and many low-power base stations 108-120 serving corresponding small cells 128-140. The low-power base stations 108-120 may include but are not limited to, e.g., micro base stations, pico base stations, femto base stations, and/or relay base stations. The transmit power of the low-power base stations 108-120 is relatively small as compared to that of the macro base station 104. For example, in some implementations, the transmit power of the low-power base stations 108-120 may be up to 2 Watts, whereas the transmit power of the macro base station 104 may be up to 40 Watts. Each of macro cells 122, 124, 126 is coupled to one of core networks 142, 144. Base station 102 is coupled to core network 142 and base stations 104, 106 are coupled to core network 144. Core networks 142, 144 can be subsets of a single core network provided by a single service provider or can be separate core networks provided by different service providers.

A management node 146 attached to core networks 142, 144 can manage the operations of core networks 142, 144 and/or the operations of the RANs that include base stations 102-120. Management node 146 can include but is not limited to the following examples. Management node 146 can be an integral portion of core networks 142, 144 or be provided outside of core networks 142, 144, e.g., by a third party. As technologies such as Software Defined Networking (SDN) and Network Function Virtualization (NFV) transform traditional networks into software programmable domains running on simplified, lower cost hardware, management node 146 can be provided as a data center node and can further be present at different hierarchical layers within the network, e.g., management node 146 can be located at a new entity, such as a Node C in a heterogeneous cloud radio access network (H-CRAN), at network edge nodes rather than in the centralized core, a mobility management entity (MME), a packet/service-gateway (P/S-GW), a node in a multi-service management plane (MSMP), etc. Management node 146 can be cloud based and/or part of a self-organizing network (SON). One of the tools of management node 146 is PCI allocation and optimization module 147, which oversees the allocation of PCI to each of the attached base stations as a RAN is initially implemented; PCI allocation and optimization module 147 can also be utilized when the RAN is updated, which can necessitate reallocation of a number of PCI.

The low-power base stations 108-120 are deployed to eliminate coverage holes in the macro layer (i.e., the layer of macro base stations 104), mitigate the shadow fading effect, and improve the capacity in traffic hot-spots. In at least one embodiment, low-power base stations 108-120 can provide denser coverage capable of providing high-speed, wideband downlink services in metropolitan areas through, for example, the new millimeter wave base stations. Due to their low transmit power and smaller physical size, the low-power base stations 108-120 can offer flexible site acquisitions. These low-power base stations, however, can be densely packed and can present difficulties in allocating PCI without causing collisions.

Wireless devices 150-168 may communicate with any of base stations 102-120 for which the wireless device is equipped and authorized, which can be an eNB or new radio base station, termed a gNB, over a wireless interface. For example, the wireless device may transmit wireless signals to any eNB or gNB and/or receive wireless signals from any eNB or gNB. The wireless signals may contain voice traffic, data traffic, control signals, and/or any other suitable information.

Figure 2:
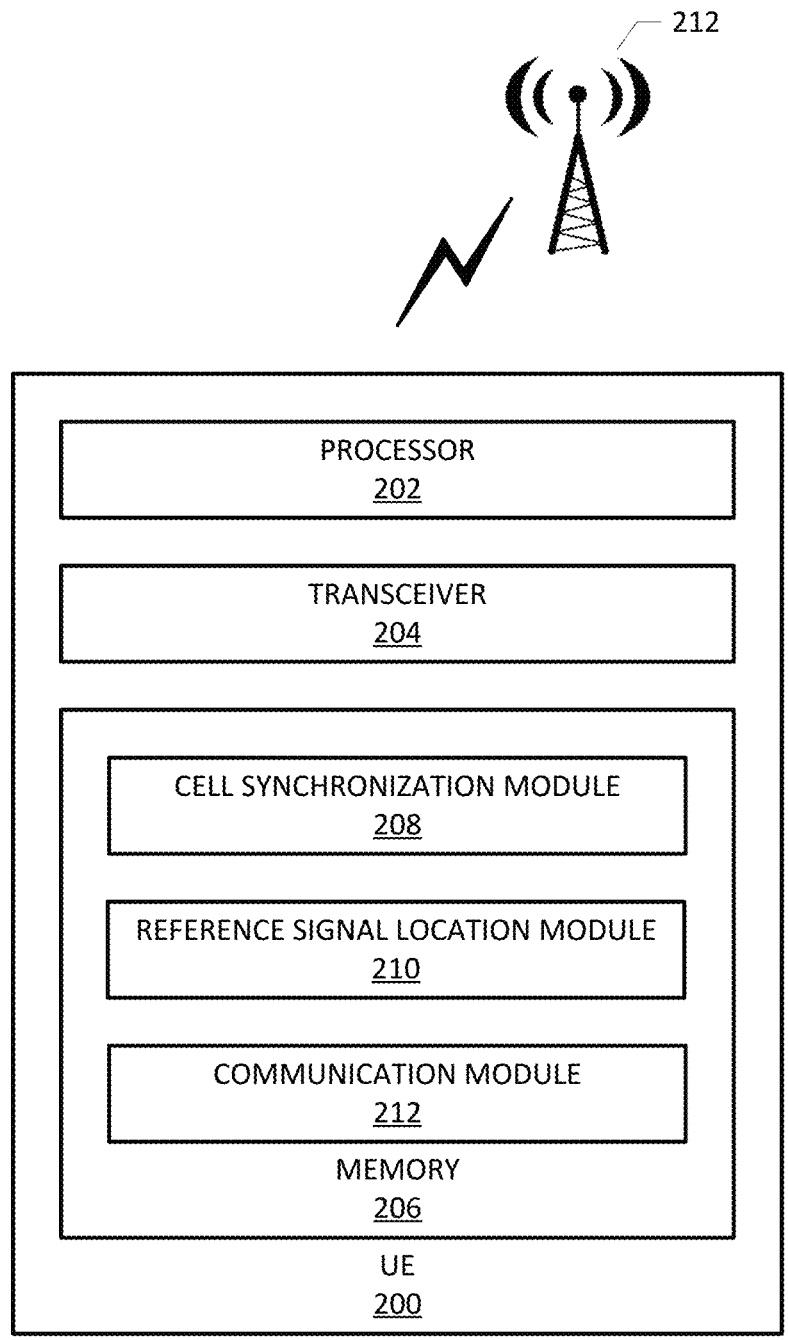
FIG. 2 depicts a UE device operable in the network environment and which utilizes the PCI allocated in an embodiment of the disclosure to determine the location of reference signals utilized in cell selection, cell reselection and handover procedures.

FIG. 2 depicts a functional block diagram of a UE 200 operable in the network 100 according to an embodiment of the disclosure. As illustrated, UE 200 includes a processor 202, a transceiver 204 that is coupled to the processor 202 and memory 206 that is also coupled to the processor 202. Stored in the memory 206 are a cell synchronization module 208, a reference signal location module 210 and a communication module 212, each of which is implemented in software. When UE 200 wants to camp on any cell, e.g., cells 122-140, cell synchronization module 208 performs cell synchronization with an appropriate base station 102-120 as a first step in order to acquire the PCI, time slot and frame synchronization information that will enable UE 200 to read system information blocks from a particular network.

To accomplish cell synchronization, UE 200 tunes to different frequency channels depending upon which bands the UE is supporting. Assuming that it is currently tuned to a specific band/channel, synchronization module 208 first finds the primary synchronization signal (PSS), which enables the UE to be synchronized on the sub-frame level. In a next step synchronization module 208 finds the secondary synchronization signal (SSS), from which UE 200 is able to obtain a physical layer cell identity group number. The combination of PSS and SSS can be utilized to determine the PCI. Once UE 200 knows the PCI for a given cell, reference signal location module 210 is able to determine the location of cell reference signals, which are used in channel estimation, cell selection/reselection and handover procedures. Communications module 212 is then able to send signals to and receive further signals from the base station for the cell.

Figure 3:
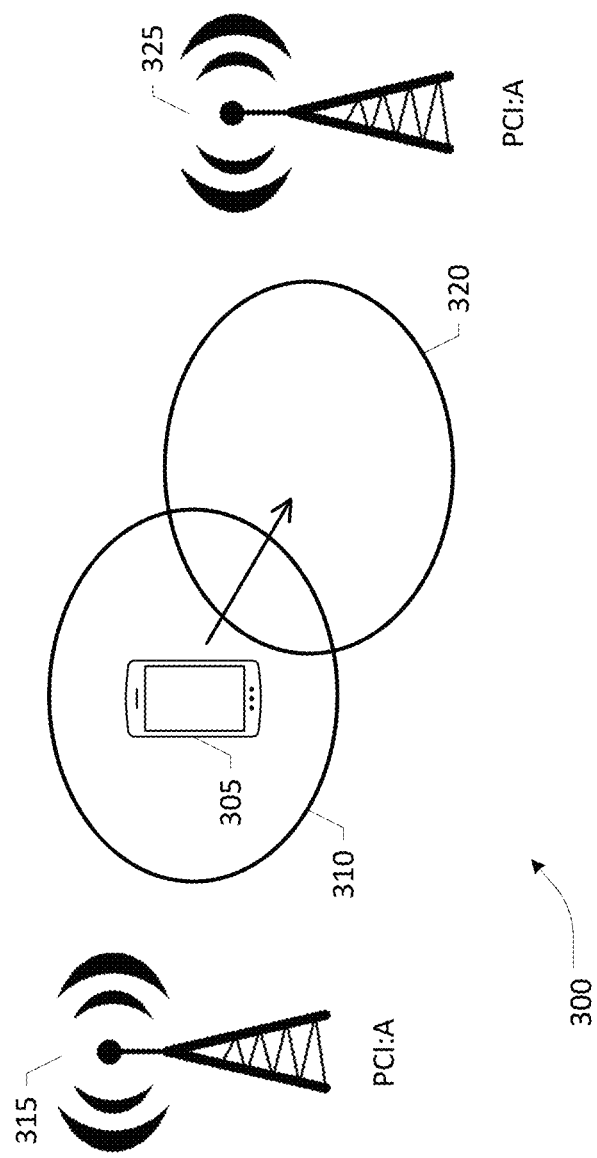
FIG. 3 depicts an example of a collision in a network.

As previously mentioned, one of the issues that can arise in the network due to PCI allocation is collision. For an allocation to be collision-free, no two neighboring cells operating at the same frequency should share the same PCI. A collision 300 is illustrated in FIG. 3, where two neighboring cells do share the same PCI. UE 305 is operating in cell 310 and is connected to base station 315. As UE 305 moves into a region of overlap between cell 310 and cell 320, it becomes necessary for UE 305 to be handed over from base station 315 to base station 325. However, because cell 310 and cell 320 share the same PCI, there is no unambiguous way to notify UE 305 to which cell the UE should be attached at any given time. The UE could interpret a command to hand-over to cell 320 as if the UE should stay connected to cell 310. Such an interpretation would eventually lead to a service interruption for UE 305, as UE 305 would lose the existing connection with base station 315 without establishing a connection to base station 325 as UE 305 moves further into cell 320. Clearly, such collisions should be eliminated wherever possible and minimized where it is not possible to eliminate all collisions.

Figure 4:
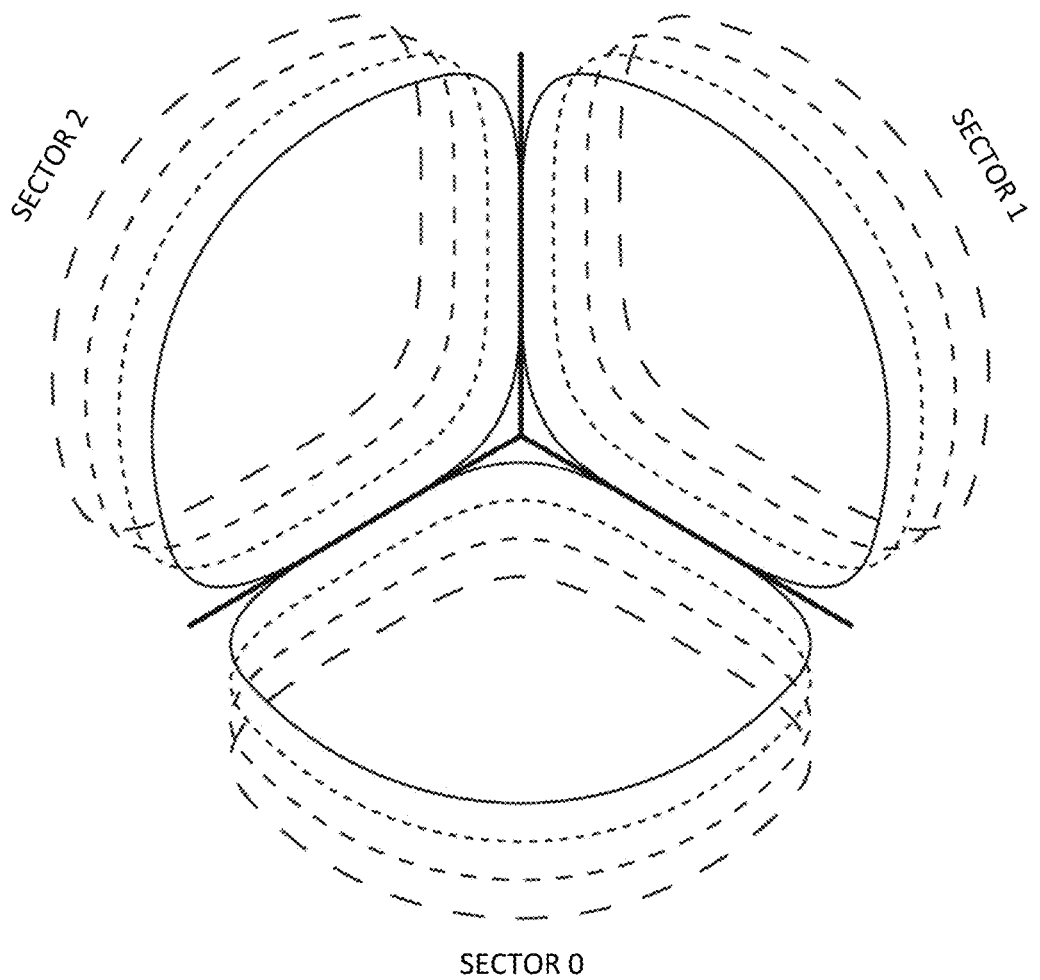
FIG. 4 depicts an example three-sector site with four carriers per cell.
Figure 4:
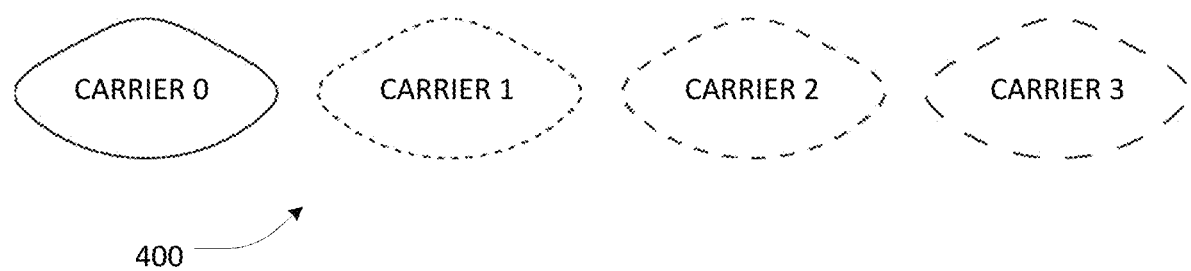

Referring now to FIG. 4, an example cell site 400 having three sectors and four carriers is disclosed. As utilized herein, a cell site is the location of a base station, e.g., a New Radio gNB. The base station may, in some embodiments, comprise antennas that consist of multiple antenna elements which can be individually controlled with respect to magnitude and phase to achieve directivity. In other embodiments, the base station may comprise antennas physically designed e.g. with dipole, reflector and directors, to provide a certain directivity of the transmitted or received signals. In yet some embodiments, some or all of the multiple antenna elements comprising an antenna may be physically designed to provide certain directivity while at the same time allowing to be individually controlled with respect to magnitude and phase, i.e., a partial or full combination of aforementioned two sets of embodiments. The directivity of the antennas allow transmission or reception to be focused towards a first direction, called a main lobe or a beam, whereas transmission to or reception from other directions, called side lobe(s) and back lobe, are attenuated. In the example shown in FIG. 4, Sector 0 has a main lobe directed along an azimuth of 180; Sector 1 has an azimuth of 60 and Sector 2 has an azimuth of 300.

Each sector of cell site 400 has four 100 MHz carriers, numbered 0 through 3. Four unique PCIs are required for a three-sector site with four carriers. These four PCI can be arbitrarily chosen from a list of PCIs with low peak to average ratio (PAR) and assigned to the carriers according to the distribution shown in Table 1.

TABLE 1

| Sector 0 | PCI | Sector1 | PCI | Sector2 | PCI |
|---|---|---|---|---|---|
| Carrier 0 | 0 | Carrier 0 | 1 | Carrier 0 | 2 |
| Carrier 1 | 1 | Carrier 1 | 2 | Carrier 1 | 3 |
| Carrier2 | 2 | Carrier 2 | 3 | Carrier 2 | 0 |
| Carrier 3 | 3 | Carrier 3 | 0 | Carrier 3 | 1 |

The reference signals used by a cell, e.g., xPDSCH utilized for the 5G physical downlink shared channel, are based on the PCI. That is, within the cell, the channels are scrambled using the PCI which means that the PCI serves as the seed for the cell's permutation algorithm. As previously mentioned, the UE has to decode the PSS and SSS before reading any other channel as the UE needs to obtain the PCI, which identifies the permutation used in the cell. The PAR for a signal based on the PCI varies depending on the selected PCI. A high PAR value can result in performance degradation when the highest modulation and coding rate is used. PAR is more pronounced in multi-carrier systems, e.g. the Orthogonal Frequency Division Multiplexing (OFDM) utilized in 4G and 5G networks, since a large number of orthogonal, narrowband carriers are used, which when added up coherently give a large PAR. The PCIs shown in Table 2 below have been established as the twenty-one low PAR IDs allowed in 5G in order to avoid such degradation. The order (O) in Table 2 reflects increasing PAR, i.e., PCI 202 has the lowest PAR.

TABLE 2

| O | PCI |
|---|---|
| 1 | 202 |
| 2 | 39 |
| 3 | 145 |
| 4 | 102 |
| 5 | 230 |
| 6 | 253 |
| 7 | 162 |
| 8 | 37 |
| 9 | 209 |
| 10 | 161 |
| 11 | 229 |
| 12 | 195 |
| 13 | 194 |
| 14 | 42 |
| 15 | 236 |
| 16 | 8 |
| 17 | 191 |

TABLE 2-continued

| O | PCI |
|---|---|
| 18 | 128 |
| 19 | 110 |
| 20 | 67 |
| 21 | 31 |

Given an available count, P, of PCI and the number, C, of carriers per sector, the available number of PCI groups can be calculated using the function ROUNDDOWN (P/C, 0), which rounds down to the nearest integer. To assign a specific group of PCI to a site, each group of PCI is allocated a group ID. Input to this assignment process is an available list of PCI, ordered as per suitability of inclusion in a single group. Considering, for example, three-sector sites with four carriers per cell, each PCI group will consist of four PCI. The PCI Group ID can be generated manually; an example set of groups (G) is shown in Table 3:

TABLE 3

| O | PCI | G |
|---|---|---|
| 1 | 202 | 1 |
| 2 | 39 | 1 |
| 3 | 145 | 1 |
| 4 | 102 | 1 |
| 5 | 230 | 2 |
| 6 | 253 | 2 |
| 7 | 162 | 2 |
| 8 | 37 | 2 |
| 9 | 209 | 3 |
| 10 | 161 | 3 |
| 11 | 229 | 3 |
| 12 | 195 | 3 |
| 13 | 194 | 4 |
| 14 | 42 | 4 |
| 15 | 236 | 4 |
| 16 | 8 | 4 |
| 17 | 191 | 5 |
| 18 | 128 | 5 |
| 19 | 110 | 5 |
| 20 | 67 | 5 |
| 21 | 31 | 5 |

By combining the PCI groups of Table 3 with the PCI allocation example of Table 1, an example allocation of PCI Group 1 across the sectors of cell site 400 is shown in Table 4.

TABLE 4

| Sector 0 | PCI | Sector1 | PCI | Sector2 | PCI |
|---|---|---|---|---|---|
| Carrier 0 | 202 | Carrier 0 | 39 | Carrier 0 | 145 |
| Carrier 1 | 39 | Carrier 1 | 145 | Carrier 1 | 102 |
| Carrier2 | 145 | Carrier 2 | 102 | Carrier 2 | 202 |
| Carrier 3 | 102 | Carrier 3 | 202 | Carrier 3 | 39 |

In one embodiment, mapping of PCI values to PCI groups is implemented through a dictionary. For example, if P is equal to twenty-one and C is equal to four, then the available count of PCI groups is equal to five and the following function will be used for identifying PCI values for a PCI Group:

```
dict_cigroup = {
    '1':'202,39,145,102',
    '2': '230,253,162,37',
    '3': '209,161,229,195',
```

```
'4': '194,42,236,8',
'5': '191,128,110,67',
}
```

In order to eliminate or minimize collision between cells, the disclosed method calculates the coverage overlap between two sectors and acts to minimize the area in which any possible collision can occur. Prior to calculating coverage overlap between two sectors, it is necessary to establish the coverage polygon for each sector.

Coverage plots, which illustrate the expected or typical coverage for a cell/sector, can be produced for an individual cell or sector or for a number of cells/sectors as a composite display. Once raw coverage for each sector has been computed, it is possible to analyze the network to determine a "best server" prediction plot that illustrates which sector produces the strongest signal at each point throughout the network. Such plots can be provided, for example, by Planet, a provider of radio frequency network planning and optimization software, or by other propagation tools. When the best server prediction plot is exported in a shape file or other format, each polygon representing a cell or sector typically has a generic naming convention and will not be directly linked with a site or sector ID. In order to utilize the best server prediction plot, each sector must be correctly matched with corresponding identification, which in one embodiment is provided by a sector identification polygon.

Figure 5:
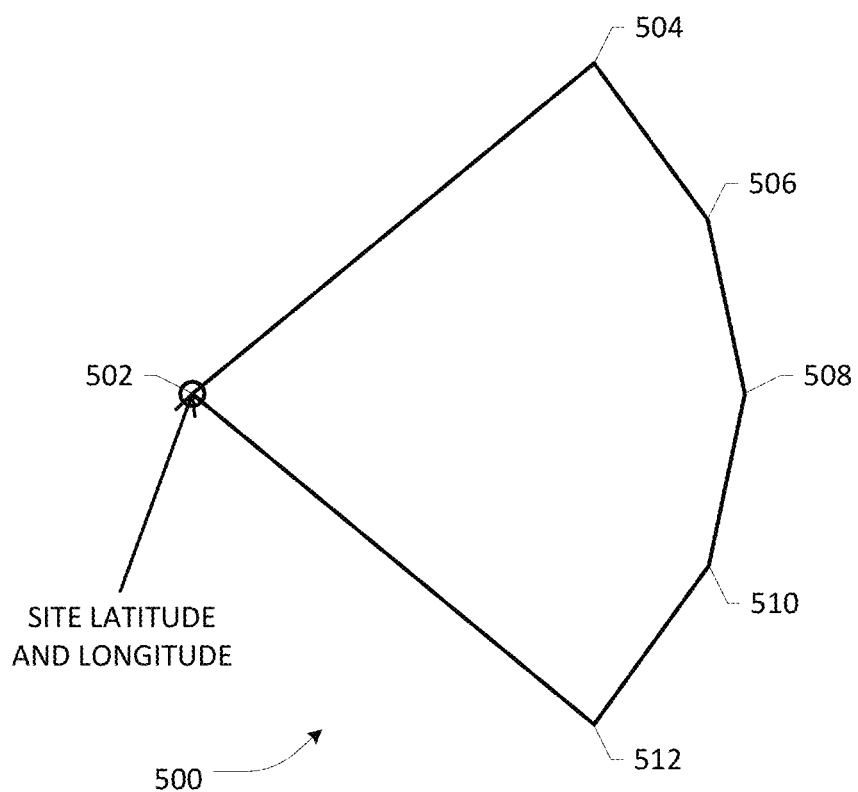
FIG. 5 depicts an identification polygon for a cell sector that can be utilized in a method for automatic PCI allocation according to an embodiment of the present invention.
Figure 6:
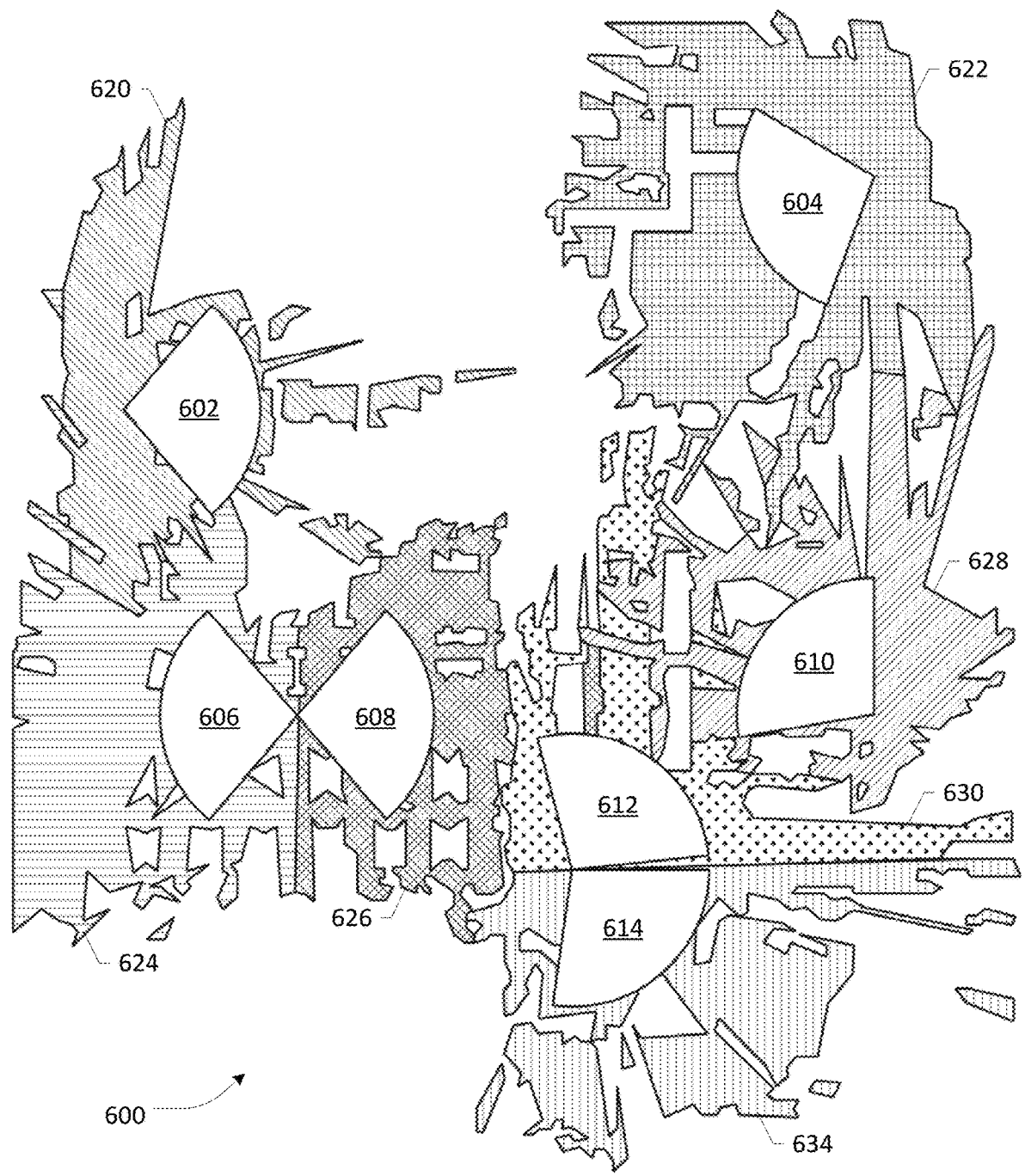
FIG. 6 depicts a best server map for a RAN that has been correlated with a set of corresponding identification polygons as created in an embodiment of the disclosed invention.
Figure 7:
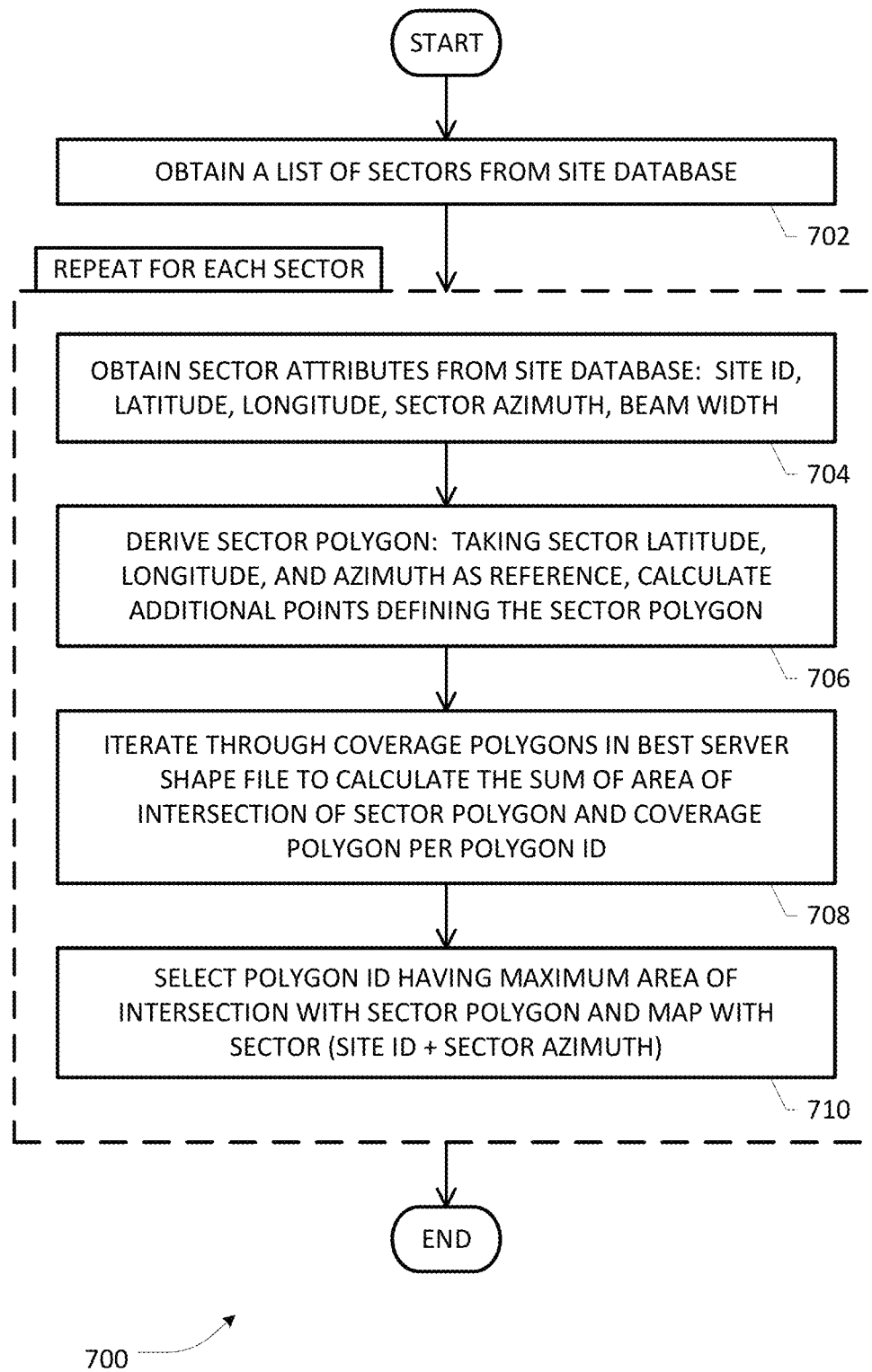
FIG. 7 illustrates an example method for mapping identification polygons to coverage polygons according to an embodiment of the disclosure.

The identification process begins with a site database that contains, for each sector, a site ID, the latitude and longitude where the base station is located, the sector azimuth, beam width, and the best server prediction plot. In one embodiment the best server prediction plot is provided as a shape file from Environmental Systems Research Institute, Inc. (ESRI), which provides software for creating shapefiles directly or converting data into shapefiles from other formats. The output of the identification process provides a mapping of site ID, sector azimuth and a polygon ID that uniquely identifies the sectors in the best server prediction plot, an example of which is shown in FIG. 6. FIG. 5 depicts an example identification polygon 500 that can be created by the process as identification in the best server prediction plot, while the method 700 of creating an identification polygon 500 for a specific sector is discussed with reference to FIG. 7. Method 700 begins with obtaining 702 a list of sectors from the site database, where the list contains all sectors that need to be allocated a PCI. Once the list has been obtained, each sector is taken in turn to create an identification polygon for the sector that has, for example, six specific coordinate points plotted.

The attributes for the sector are obtained 704 from the site database, specifically the site ID, latitude, longitude, azimuth and beam width associated with the sector. These attributes are then utilized to derive 706 the sector polygon by calculating the location of specific points within the sector to define an identification polygon representing the sector. In identification polygon 500 in FIG. 5, for example, point 502 is plotted at the latitude and longitude of the base station. The azimuth of the sector shown is 90, giving the orientation of the polygon as shown. The latitude and longitude of five additional points 504-512 are calculated using an angle of, for example, plus or minus thirty degrees from the azimuth and a short distance from the base station of, for example, one hundred meters. Identification polygon 500 defines an area that will lie within or largely within the sector to which the polygon 500 belongs.

Using the identification polygon 500 for a given sector, the method iterates 708 through the coverage polygons in the best server shape file. For each coverage polygon, the method calculates the intersection between the area covered by the identification polygon and the area covered by the coverage polygon. The method then selects 710 the coverage polygon having the greatest area of intersection with the identification polygon and maps the selected coverage polygon with the sector ID and sector azimuth. The output of method 700 is an identified best server prediction map 600 as shown in FIG. 6. Identified best server prediction map 600 contains a site ID (not specifically shown), sector azimuth and an identification polygon mapped to the correct coordinates for the corresponding coverage area in the best server plot. In identified best server prediction map 600, seven identification polygons are shown, appropriately placed on the map of their best server prediction polygons and showing their respective locations and azimuth. In map 600, identification polygon 602 is correlated with coverage region 620, identification polygon 604 is correlated with coverage region 622, and identification polygon 610 is correlated with coverage region 628. Each of these identification polygons is associated with a cell site that includes only one sector. Identification polygons 606, 608 identify two sectors of a single cell site and are correlated respectively with coverage polygons 624, 626. Similarly, identification polygons 612, 614 identify two sectors of a single cell site and are correlated respectively with coverage polygons 630, 634.

In one embodiment as shown in identified coverage map 600, the disclosed method is utilized to assign PCI for New Radio cell sites that provide millimeter wave communications in a crowded metropolitan region or other area providing dense coverage, although the method is not limited to this application. In the specific embodiment shown, all locations have either one or two sectors, although this also is not a limitation. It is worth noting in this figure that because of the dense coverage and intervening landscape such as buildings, the "best server" can sometimes change multiple times in a short distance, heightening the need for seamlessly transferring sessions.

Figure 8A:
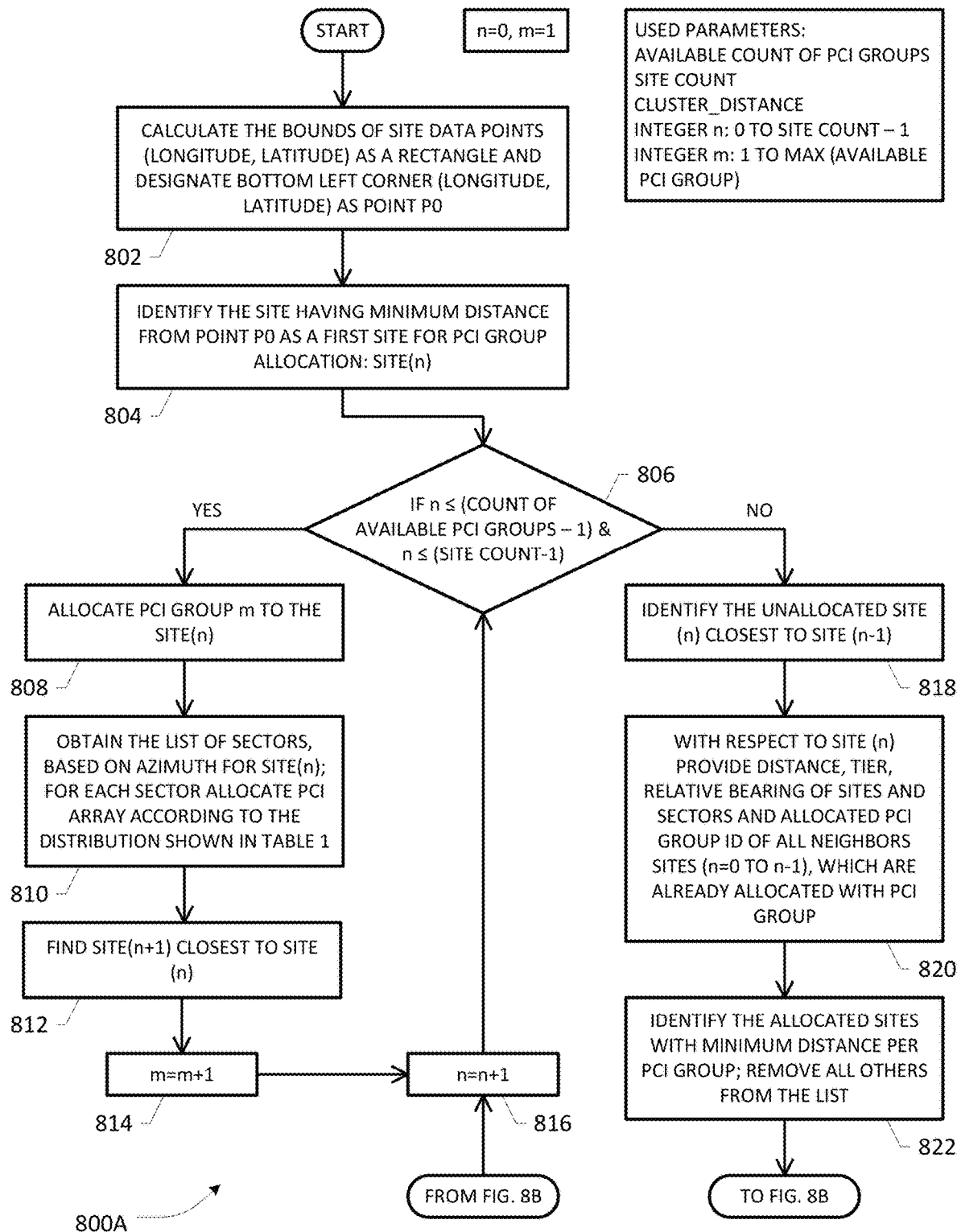
FIGS. 8A-8B illustrate an example method for initially allocating PCI groups to cell sites in an example embodiment of the present invention.
Figure 8B:
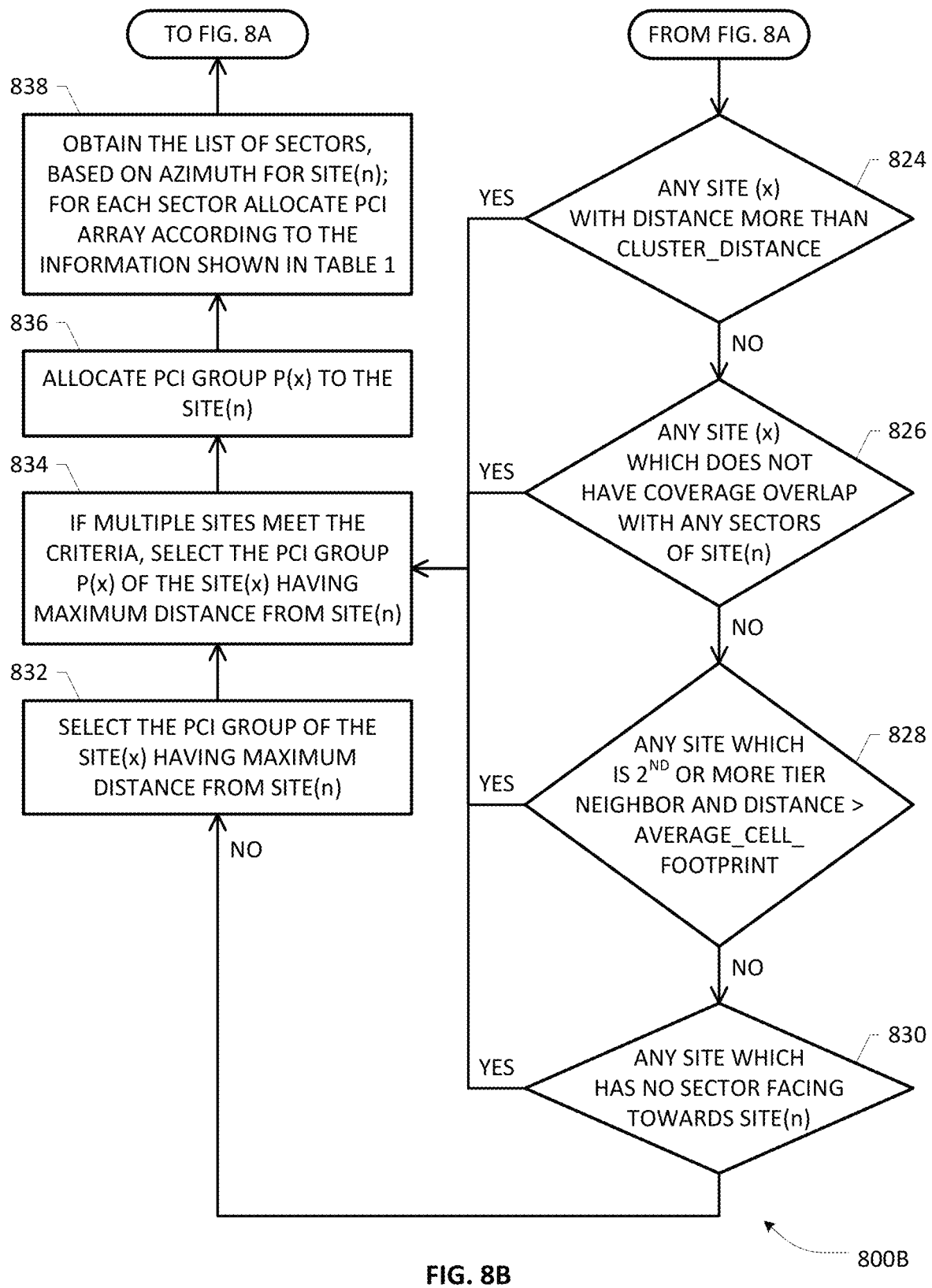

Once identified best server prediction map 600 has been created, the allocation of PCI groups can be initiated, as shown in FIGS. 8A and 8B. Method 800A, 800B uses two variables: n is utilized to designate the cell site and m is utilized to designate the PCI group to be assigned to cell sites. The initial values are n equals zero and m equals one. Method 800A begins with calculating 802 the bounds of all site data points, i.e., latitude and longitude, as a rectangle and designating the latitude and longitude of the left bottom corner point as a starting point PO. Other starting points can, of course, also be selected. The site that is located the minimum distance from Point PO is identified 804 as a first site for PCI group allocation and becomes site (n).

If there are, for example, five PCI groups, then the first five sites to be allocated a PCI group can receive one of the five PCI groups without having to be concerned with any conflicts. Therefore, a determination is made 806 whether n is both less than or equal to the available number of PCI groups minus one and is also less than or equal to the number of sites, i.e., the site count, minus one. If the answer is yes, PCI group m is allocated 808 to site (n). Since the same PCI group is utilized for all of the sectors in a single cell, a list of sectors associated with site (n) is obtained 810, based on the azimuth of each sector and the PCI in PCI group m are allocated to each sector according to the distribution shown in Table 1 above. The next site to be allocated is determined by finding 812 the site (n+1) that is the closest to site (n). The value of m is incremented 814 by one; the value of n is incremented 816 by one; and the method returns to the decision of element 806. The loop that includes elements 806-816 will be performed once for each available PCI group. After that point, n becomes greater than the count of available PCI groups minus one and the answer to element 806 becomes no. For the remaining sites, potential conflict between the site to be allocated and those sites that have already been allocated is determined before allocation.

The next site to be allocated is selected by identifying 818 the unallocated site (n) that is closest to site (n-1), i.e., the site just allocated. Once site (n) has been determined, the method provides 820, for the group of sites (n=0 to n-1) that have already been allocated a PCI, the distance, tier and relative bearing of all sectors for each site in relationship to site (n), as well as the allocated PCI group for each site. Illustrations of several terms, i.e., cluster distance, average cell footprint, tier determination and relative bearing are illustrated in FIGS. 10A-10D, which will be discussed later. For each PCI group, the method identifies 822 the allocated site that has the minimum distance from site (n). The group of sites that have the minimum distance from site (n) for their PCI group form a group of closest neighbors.

The method determines 824 whether one or more site(s) (x) in the group of closest neighbors meets a first criterion of having a distance from site (n) that is greater than a cluster distance; if the answer is yes, site(s) (x) are selected and the method moves to element 834. If no site in the group of closest neighbors has a distance greater than the cluster distance, then the method determines 826 whether one or more site(s) (x) meets a second criterion of not having any coverage overlap with any sector of site (n) and if the answer is yes, the site(s) (x) are selected and the method again moves to element 834. If no site in the group of closest neighbors lacks a coverage overlap with any sector of site (n), then the method determines 828 whether one or more site(s) (x) meets a third criterion of having a tier relationship with site (n) that is second tier or greater and a distance that is greater than the average cell footprint and if the answer is yes, the site(s) (x) are selected and the method again moves to element 834. If no site in the group of closest neighbors meets the third criterion, then the method determines 830 whether one or more site(s) (x) meets a fourth criterion of having no sector that faces towards site (n) and if so, the site(s) (x) are selected and the method again moves to element 834. If none of the closest neighbors meets any of the criteria, the PCI group of the site (x) that has the maximum distance from site (n) is selected 832 and the method moves to element 834.

Regardless of the selection criteria used to reach element 834, if multiple sites met the criteria, the PCI group P(x) of the site (x) that has the maximum distance from site (n) is selected 834; otherwise, if only a single site met the criteria, the PCI group of the single site is selected. PCI group P(x) of site (x) is allocated 836 to site (n). A list of sectors for the site is obtained 838, based on azimuth and the PCI array is allocated to the sectors according to the information discussed with regard to Table 1 above. After the allocations have taken place, n is incremented 816 by one and the method returns to the decision at element 806. The loop containing elements 806, 816 and 818-838 is performed for all unallocated sites and terminates once all sites have been allocated. When an allocation has been made in response to one of the determinations made at elements 828 through 832, the allocation may potentially result in conflict, which should be resolved to the extent possible.

Figure 9:
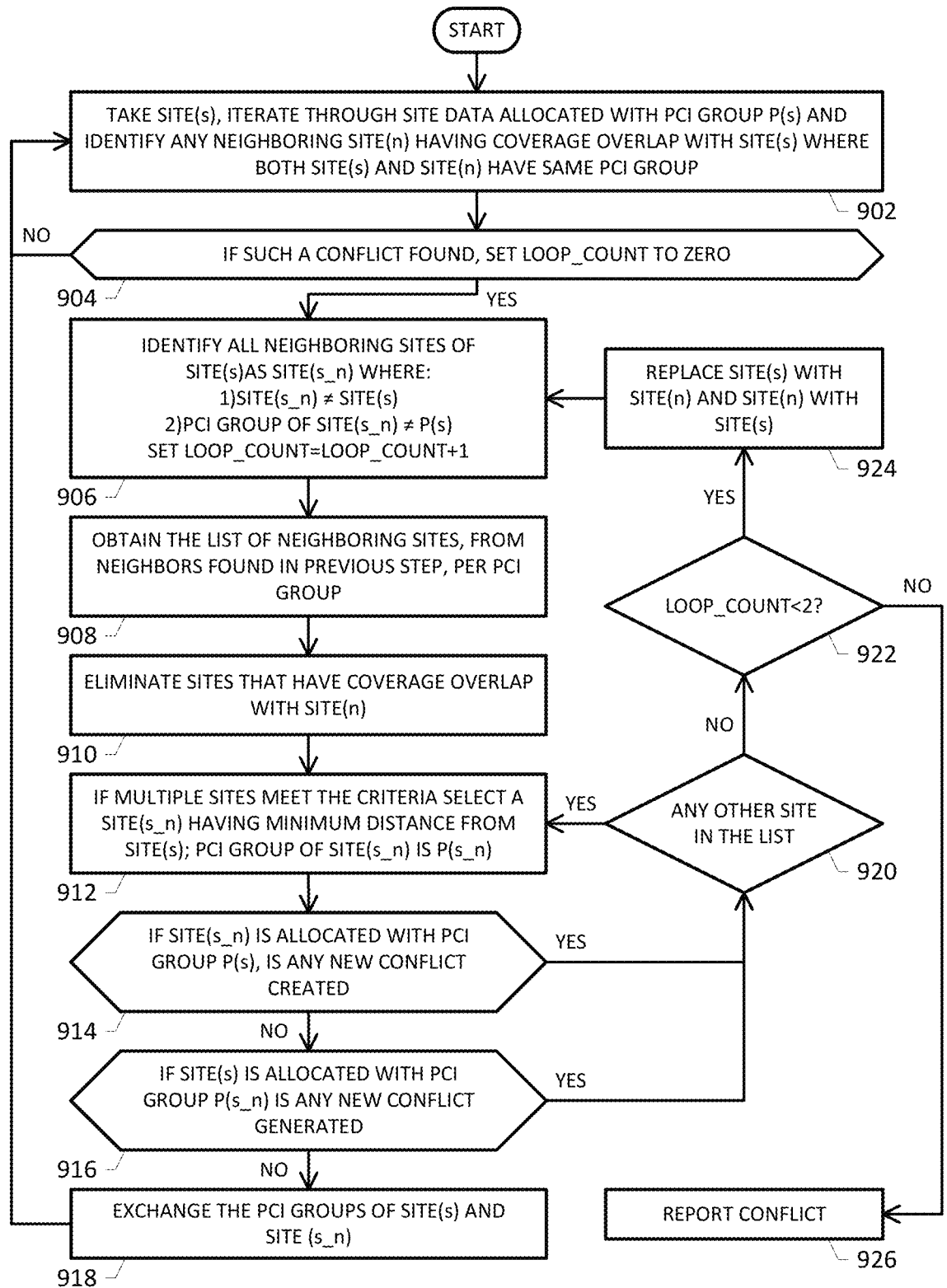
FIG. 9 illustrates a method for optimizing allocations of PCI by addressing any conflicts created by the initial allocation in an example embodiment of the present disclosure.

FIG. 9 depicts a method 900 of optimizing the allocation of PCI to remove or minimize conflict between any sites. In order to identify conflict for a site (s) having a PCI group P(s), the data for sites having PCI group P(s) is iterated 902 through to determine any sites that have coverage overlap with site (s) and which also share PCI group P(s) with site (s). When a conflict is found 904, a loop count is initialized to zero and the method moves to resolve the conflict. The process identifies 906 any neighboring site of site (s), designated as site (s_n), where site (s_n) does not equal site (s), i.e., site (s_n) is not a different sector at the same site as site (s), and where the PCI group of site (s_n) is not equal to P(s); the loop count is also incremented by one. The method then obtains 908 the list of neighboring sites (s_n) per PCI group; normally within the PCI group, the method will select a neighboring site that has a tier relationship with site (n) that is two or greater to reduce the possibility of conflicts. The method then eliminates 910 from the list of neighboring sites those sites that have coverage overlap with site (n). If multiple sites remain, the method will iterate 912 through the multiple sites, starting with a site (s_n) that has the minimum distance from site (s), to determine whether exchanging the PCI P(s_n) of site (s_n) with the PCI P(s) of site (s) would eliminate the conflict. The method determines 914 whether any new conflict is created if site (s_n) is allocated with the PCI group P(s) of site (s). If the answer is no, the method also determines 916 whether any new conflict is created if site (s) is allocated with the PCI group P(s_n) of site (s_n). If the answer is again no, the method exchanges 918 the PCI groups of site (s) and site (s_n) and returns to element 902 to check the new site (s).

If the answer to either the determining of element 914 or the determining of element 916 is yes, exchanging the two PCI would not solve the problem and might made the situation worse. At that point, the method determines 920 whether there are any remaining sites in the list of neighboring sites that do not have coverage overlap with site (s) and if so, iteration through the multiple sites can continue at element 912 with the next closest site (s_n) to site (s). If no untested sites are available, the method checks the loop count to determine 922 whether the loop has been performed fewer than two times. If the answer is yes, the two original sites that are in conflict, i.e., site (s) and site (n) are interchanged 924 so that the same determination can be made with respect to the original site (n). The loop formed by elements 906 through 924 is then performed with the "new" site (s). If no site can be found that can be exchanged with either of the originally conflicting sites, a conflict is reported 926 and the process ends.

Figure 10A:
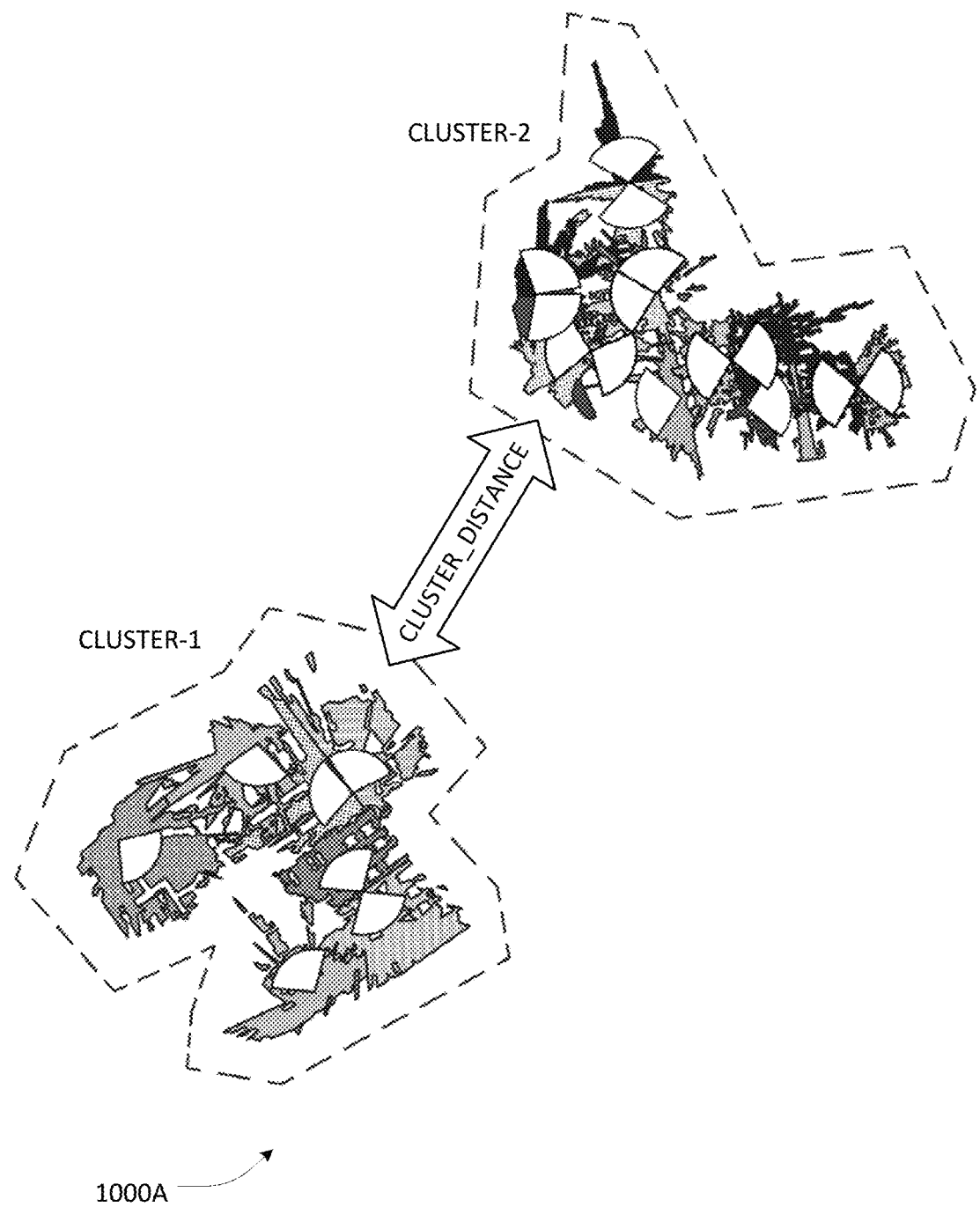
FIGS. 10A-10D illustrate a number of concepts utilized in determining the PCI group allocations.

FIGS. 10A-10D are provided for clarification of the concepts of cluster distance, average cell footprint, tier relationships and relative bearing. FIG. 10A depicts the concept of a cluster distance, in which the geo-physical location of the sites are such that they form discontinuous sets or clusters. Once the clusters are separated by a sufficient distance, i.e., the cluster distance, the problem of radio interference between two sectors having the same PCI group disappears and PCI allocation at cluster-1 can be safely done irrespective of PCI allocation at cluster-2. For the purposes of this disclosure, where allocation was performed for millimeter-wave base stations, a cluster distance of 800 meters has been utilized, although this value will vary with the type of cells being allocated and their respective transmission power.

Figure 10B:
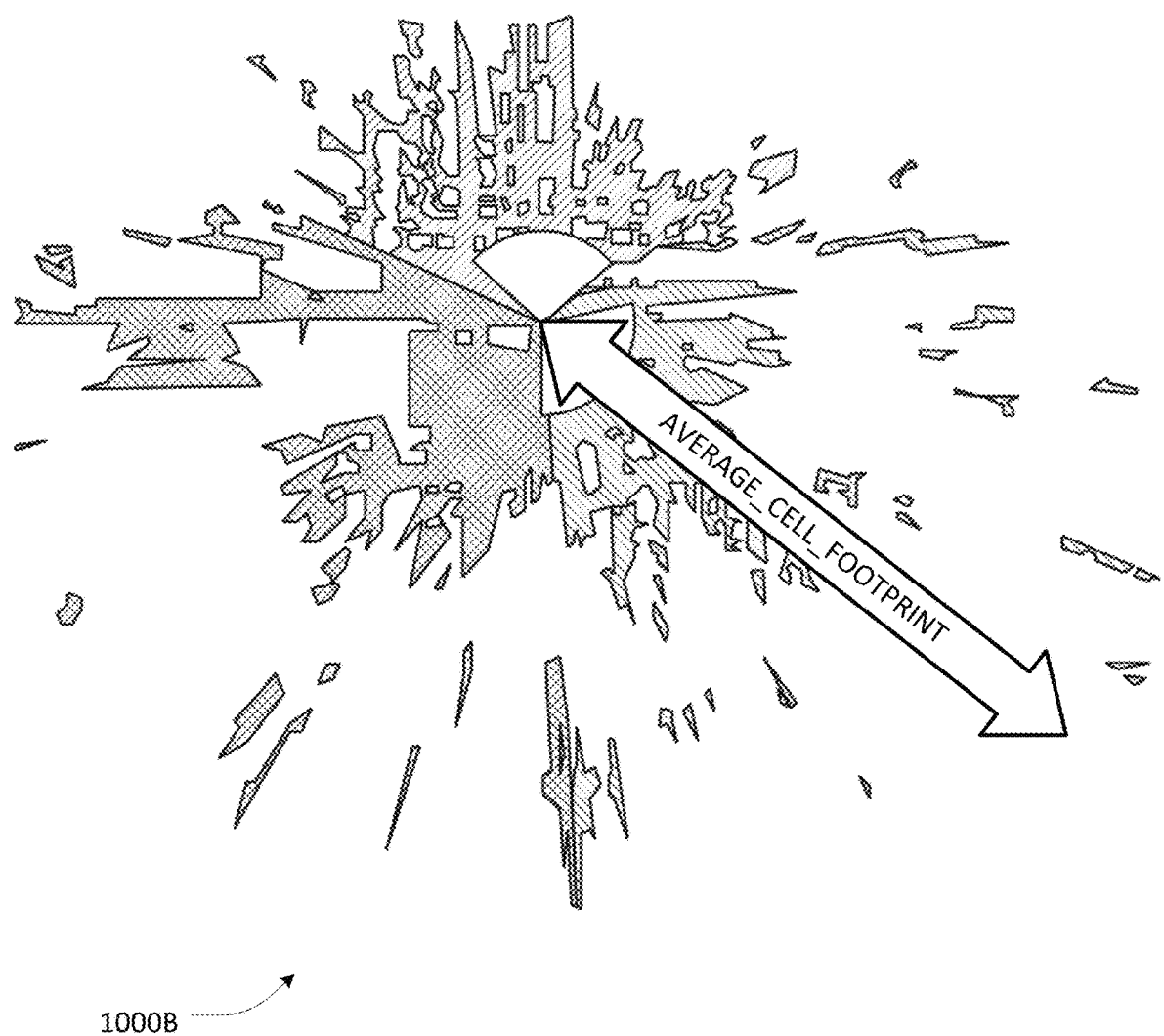
Figure 10C:
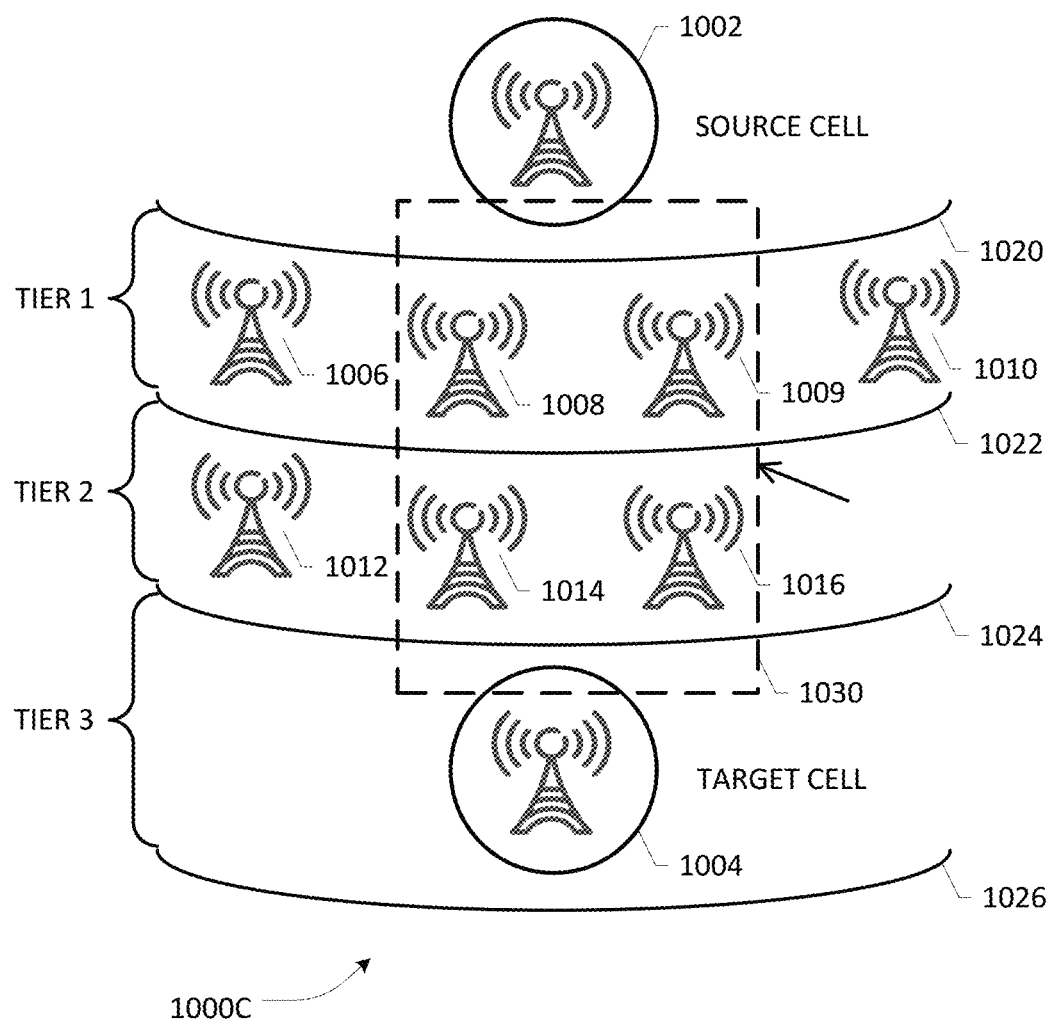

FIG. 10B depicts the average cell footprint. The average cell footprint is defined as the average distance from the site that a cell can cover with the main lobe associated with each sector. For the current disclosure, the average cell footprint has been considered as 300 meters, although this value also varies according to the type of cells being deployed. FIG. 10C depicts the tier relationship between a source cell 1002 and a target cell 1004. The term tier herein may refer to the number of layers of cell sites between source cell 1002 and target cell 1004. In one embodiment, determination of the tier relationship begins with generating a rectangle 1030 having a width of 300 meters and a length that encompasses the region between source cell 1002 and target cell 1004. Each layer may comprise cell sites that are approximately grouped to fall within an imaginary circle or substantially circular boundary whose center is the source cell. Multiple such concentric circles or substantially circular boundaries 1020-1026 may be defined by a management node, such as management node 146 according to one embodiment of the present disclosure, as a computational tool to create different tiers, e.g., Tier 1, Tier 2, and Tier 3, of cell sites located between the source cell 1002 and the target cell 1004. In the embodiment shown, target cell 1004 is in a third tier relationship with source cell 1002, as cell sites 1008 and 1009 are in a first tier out from source cell 1002 and cell sites 1014 and 1016 lie in a second tier out from source cell 1002 and each of cell sites 1008, 1009, 1014 and 1016 are between source cell 1002 and target cell 1004.

Figure 10D:
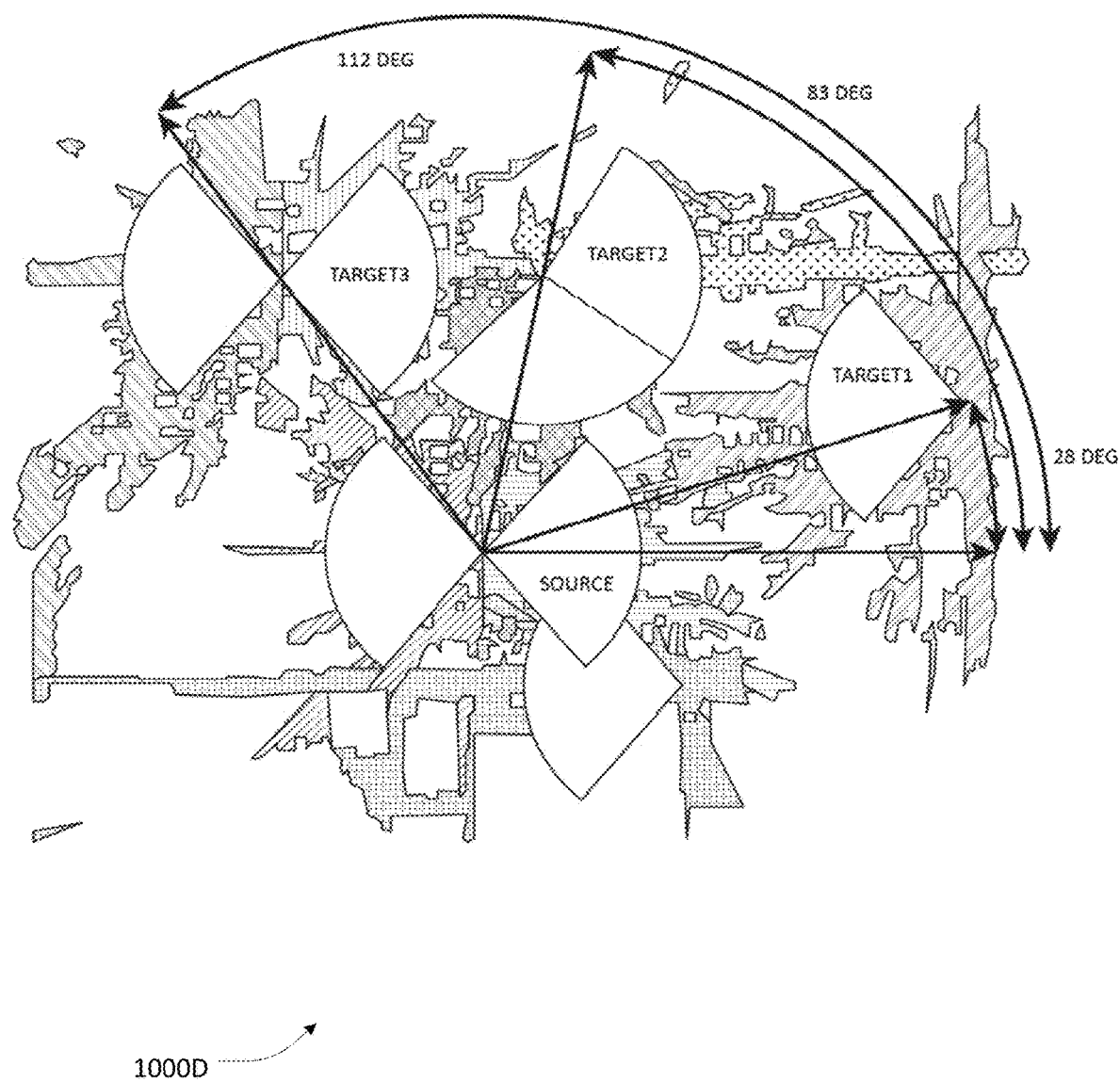

FIG. 10D depicts calculation of the relative bearing between two sectors, which is utilized to identify whether two sectors face each other. In the embodiment shown, the relative bearing of a source sector is determined against three target sectors, target1, target2, and target3. To determine the bearing of the source sector with respect to each of the target sectors, a line is drawn from the location of the base station for the source sector to the location of the corresponding base station for each of the corresponding target sectors and a respective angle is determined between the azimuth of the source sector and the line to the respective target sector. For the source sector, the angle formed with target1 is 28 degrees, the angle with target2 is 83 degrees and the angle with target3 is 122 degrees. The angle so formed indicates that the source cell is facing the target cell if the value is low and is not facing the target cell if the value is high. For example, an angle of zero indicates that the source cell is directly facing the target cell; and angle of 180 indicates that the source cell is facing directly away from the target cell; various values in between zero and 180 reflect the degree to which the source cell is facing the target cell. The same calculation is also performed from the perspective of each of the target sectors, i.e., a line is drawn between the location of the base station for the source sector and the location of the base station for the target sector; an angle formed by this line and the azimuth of the target sector is calculated and indicates the degree to which the target sector is facing the source cell. If both of the angles calculated for a source/target pair are low, then the two sectors are facing each other, while if both values are high, the sectors are not facing. The determination can be derived from Table 5 below, which in one embodiment is calculated using a user-defined function in an object-oriented programming language such as Python. As shown by Table 5, the source sector and target1 sector are facing each other; in the other two examples, neither the source sector nor the target sector faces the other.

TABLE 5

| Relation | Relative Bearing | Relation | Relative Bearing |
|---|---|---|---|
| Source→Target1 | 28 degrees | Target1→Source | 28 degrees |
| Source→Target2 | 83 degrees | Target2→Source | 106 degrees |
| Source→Target3 | 112 degrees | Target3→Source | 67 degrees |

Figure 11A:
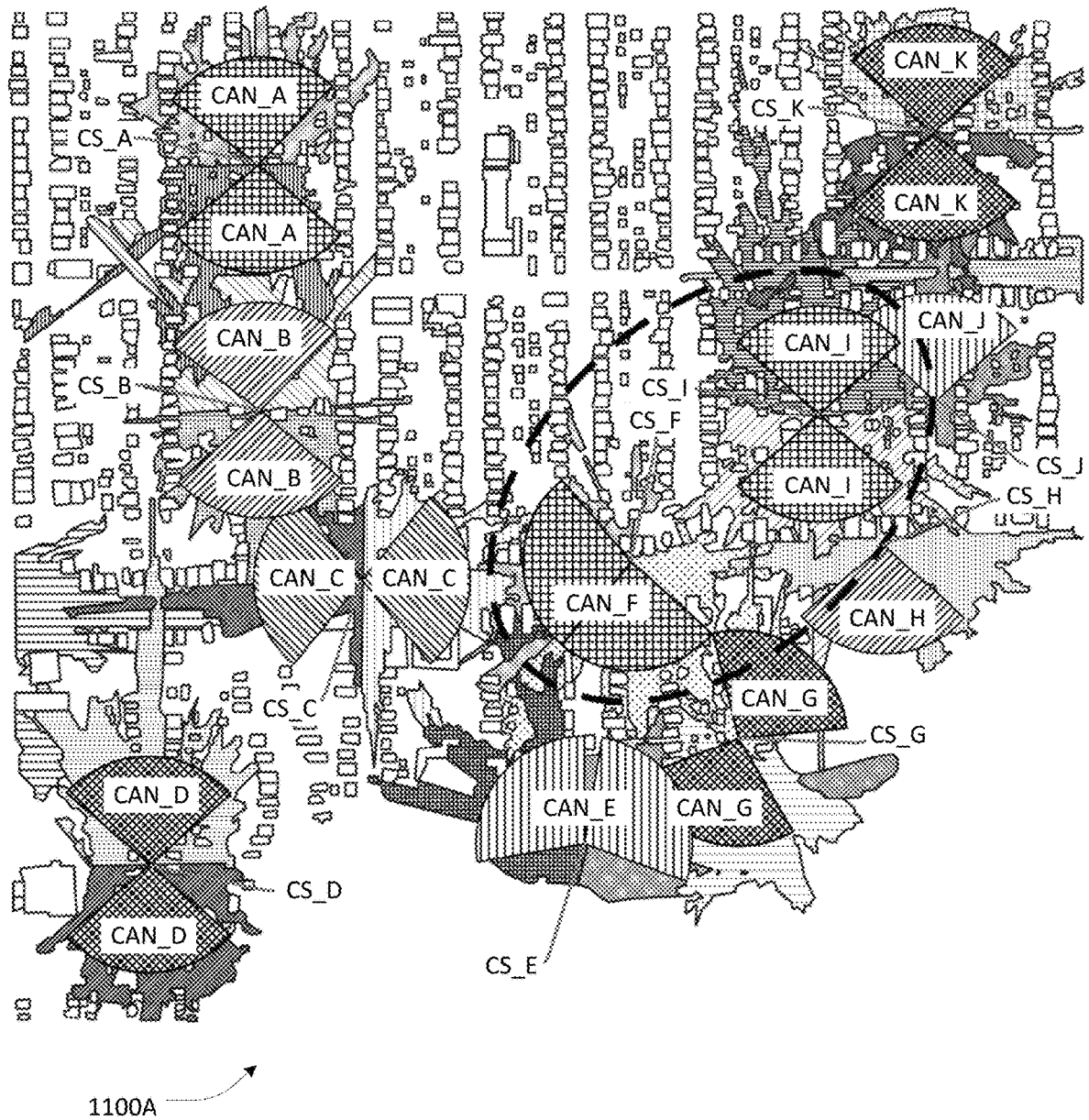
FIGS. 11A and 11B illustrate an example conflict that was resolved by an embodiment of the disclosure.
Figure 11B:
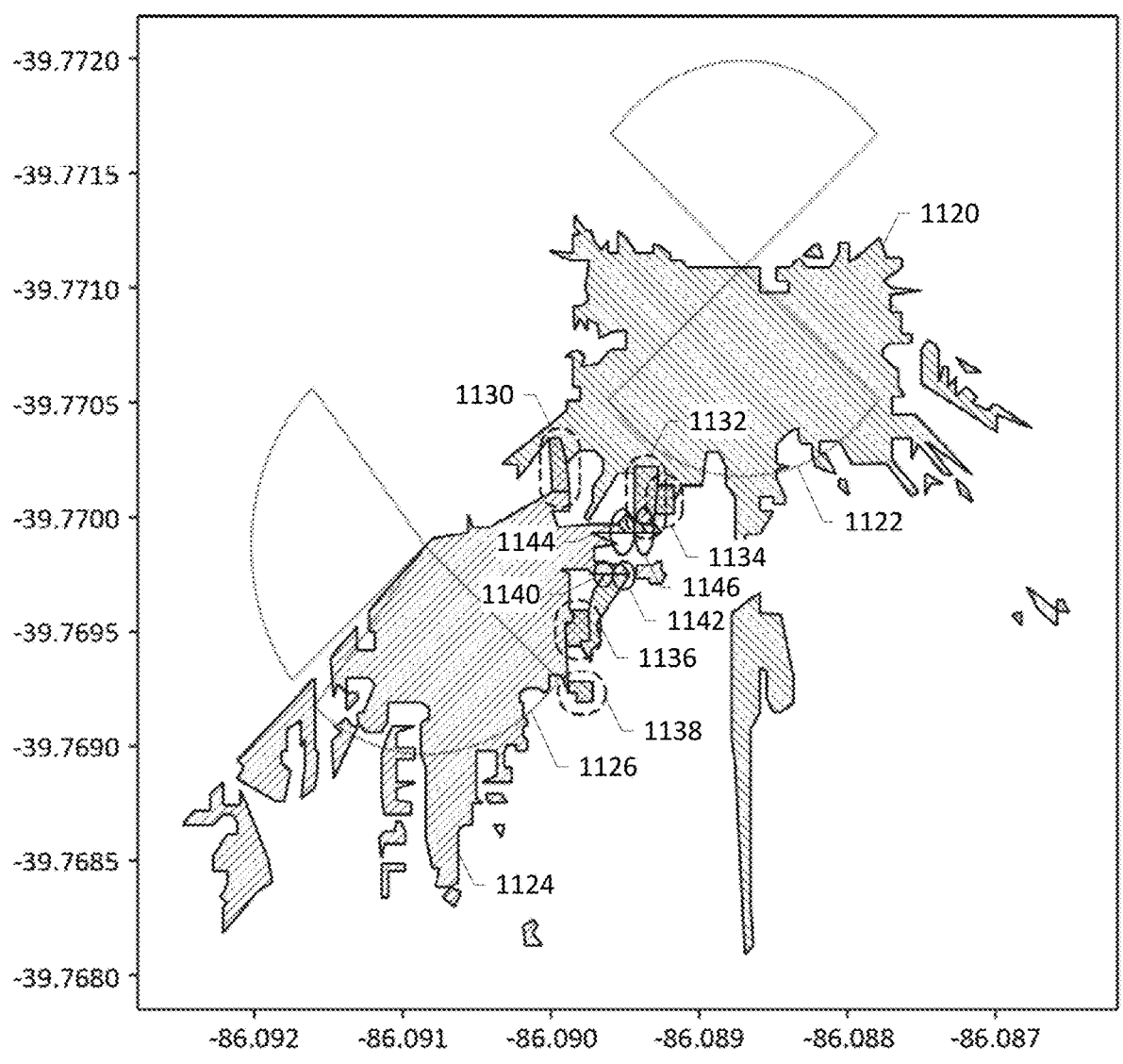

FIGS. 11A and 11B illustrate an example of an allocation conflict that was corrected using the disclosed method of optimization as discussed with respect to FIG. 9. FIG. 11A depicts the initial allocations of PCI in a network having ten base stations designated, in counter-clockwise order from the top left as CAN_A at cell site CS_A, CAN_B at cell site CS_B, CAN_C at cell site CS_C, CAN_D at cell site CS_D, CAN_E at cell site CS_E, CAN_F at cell site CS_F, CAN_G at cell site CS_G, CAN_H at cell site CS_H, CAN_I at cell site CS_I, CAN_J at cell site CS_J and CAN_K at cell site CS_K. Each of CAN_D, CAN_G, and CAN_K received a first PCI group and each of CAN_E and CAN_J received a second PCI group. Three base stations, CAN_F, CAN_I and CAN_A received a third PCI group; CAN_C received a fourth PCI group and both CAN_B and CAN_H received a fifth PCI group. The two base stations CAN_F and CAN_I, which are enclosed in an ellipse in the drawing, are in conflict, as they have both been assigned the same PCI group and the two coverage areas have coverage overlap.

FIG. 11B depicts an enlargement of these two coverage regions in order to show their areas of overlap. Sector 1122 has a coverage area 1120 and sector 1126 has a coverage area 1124. Regions 1130, 1132, 1136 and 1138 enclose buildings that are bounded by coverage of two different sites having the same PCI group and regions 1134, 1140, 1142, 1144, and 1146 enclose additional regions of coverage overlap. Clearly movement of a UE in any of these regions would be prone to dropped calls due to an inability to distinguish the cell to which the UE should be attached. The disclosed optimization method was utilized to resolve the initial conflict. The following is an internal process log of the process in which it should be noted that several candidate sites mentioned in the log are not specifically shown in FIG. 11A:

With CAN_F as source:
Below are candidates found for exchange:

['1', 'CAN_G', 194.37514349228508, '35']
['5', 'CAN_H', 242.10104753757426, '180']
['4', 'CAN_C', 254.46998804038589, '90']
['2', 'CAN_E', 262.69979873406147, '60']
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
CAN_G: Have overlap with conflict target site: CAN_I
CAN_H: Have overlap with conflict target site: CAN_I
CAN_C: Do not have overlap with conflict target site: CAN_I
CAN_F: Do not have overlap with conflict t target site CAN_I; however
    CAN_C is closer and is chosen.

```
Testing candidate: CAN_C (azimuth=90, PCI Group=4) for PCI Group
    exchange
('CAN_L', 'Site_L', '1', '•86.10222726', '39.77033417,
        'AIR_5121.pafx','11.8872', '0', '0', '720.5974489142191', 'F', '178', '178',
        '3', "('209', '161', '229', '195')", '177\n']
('CAN_A', 'Site_A', '1', '•86.09497743', '39.773147', 'AIR_5121.pafx',
        '11.8872', '180', '0', '225.0175835506283', 'F', '186', '186', '3', "('209',
        '161', '229', '195')", 185\n')
['CAN_A', 'Site_A', '2','•86.09497743', '39.773147, 'AIR_5121.pafx', '11.8872',
        '355', '0' '0.0', 'F', '187', '187'. '3' "('161', '229', '195', '209']', '186\n']
['CAN_I', 'Site_I', '1', '•86.088716', '39.771096', 'AIR_5121.pafx', '11.8872', '0',
        '0', '111.14107058718405', 'F', '223', '223', '3', "('209','161', '229',
        '195')", '222\n')
['CAN_I', 'Site_I', '2', '•86.088716', '39.771096', 'AIR_5121.pafx', '11.8872',
        '180', '0', '0.0', 'F', '224', '224', 3, "['161', '229', '195', '209']", '223\n')
Checking S_SITE exchange result for following neighbors:
['CAN_M', 'Site_M', '1', '•86.09035475', '39.79460811', 'AIR_5121.pafx',
        '11.8872', '105', '0', '227,00129612998924', 'F, '234', '234', '4', "('194',
        '42', '236', '8')', '233\n')
('CAN_M', 'Site_M', '2', '•86.09035475', '39.764160811', 'AIR_5121.pafx'.
        11.8872', '285', '0', '0.0', 'F', '235', '235', '4', "('42', '236', '8', '194']'.
        '234\n')
['CAN_N', 'Site_N', '1', '•86.08461613', '39.77238711', 'AIR_512I,pafx',
        '11.8872', '5', '0', '994.6446950071024', 'F', '236', '236', '4', '['194', '42',
        '236', '8'/, '235\n']
['CAN_N', 'Site_N', '2', '•86.084161613', '39.77238711', 'AIR_5121.pafx',
        '11.8872', '265', '0', '0.0', 'F', '237', '237', '4', '['42', '236', '8', '194')",
        '236\n']
*****************************************************************
Solution:
1) Exchange PCI group between: CAN_F and CAN_C
2) Suggested modification:
    a) CAN_F from 3 to 4
    b) CAN_C from 4 to 3
*****************************************************************
```

This conflict has been resolved.

Figure 12:
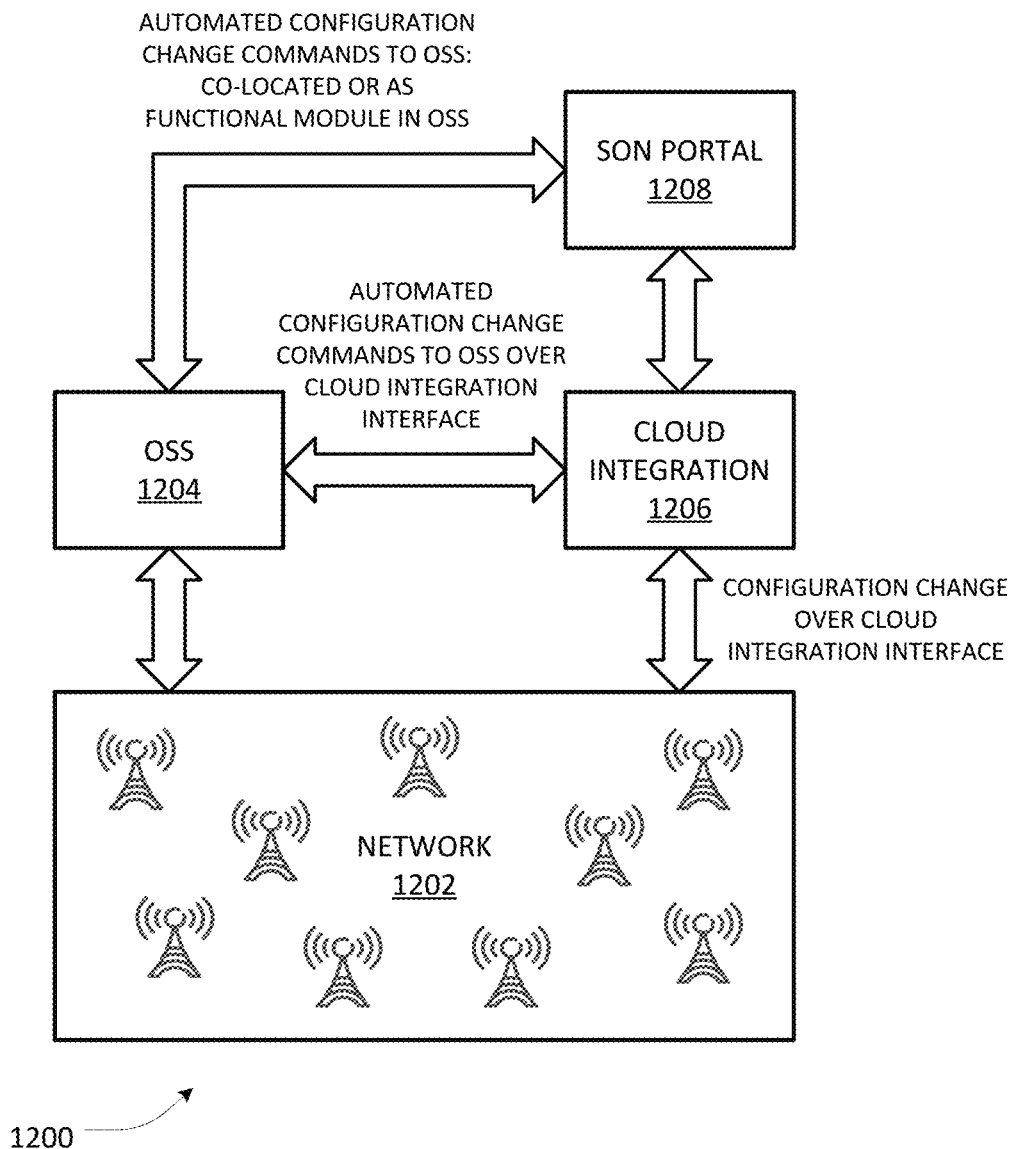
FIG. 12 illustrates an example cloud implementation according to an embodiment of the disclosure.

The disclosed PCI allocation and optimization method can be performed at any node that is tasked with allocating PCI to a group of cells. FIG. 12 provides a non-limiting example that illustrates a cloud implementation 1200 of a system according to an embodiment of the disclosure. Initial PCI allocation can be made to RAN 1202 and if changes to RAN 1202 are made, the PCI allocations can again be performed to incorporate changes in the RAN. OSS 1204 may be coupled to perform the automatic configuration and optimization functions disclosed herein and to provide the determined PCI group values to each base station in RAN 1202 or can designate a node outside of OSS 1204 to perform PCI allocation and optimization, e.g., a third party. Configuration changes can be provided by RAN 1202 to a management node, e.g., management node 146 that is inside or outside of OSS 1204 as desired. Configuration changes can also be provided through a cloud integration interface 1206. In one embodiment, a Self-Organizing Network portal 1208 is coupled to cloud integration interface 1206 and to OSS 1204 to exchange both configuration changes and resulting PCI assignments. SON portal 1208 can alternatively be co-located with OSS 1204 as a functional module. PCI group values assigned to each base station can be provided directly from OSS 1204 or through cloud integration interface 1206. OSS 1204 can also be provided as management functions, some or all of which are performed by third-party entities. The determined allocations of PCI groups to the sectors of RAN 1202 can be provided directly by OSS 1204 or through SON portal 1208 and cloud integration 1206.

Figure 13:
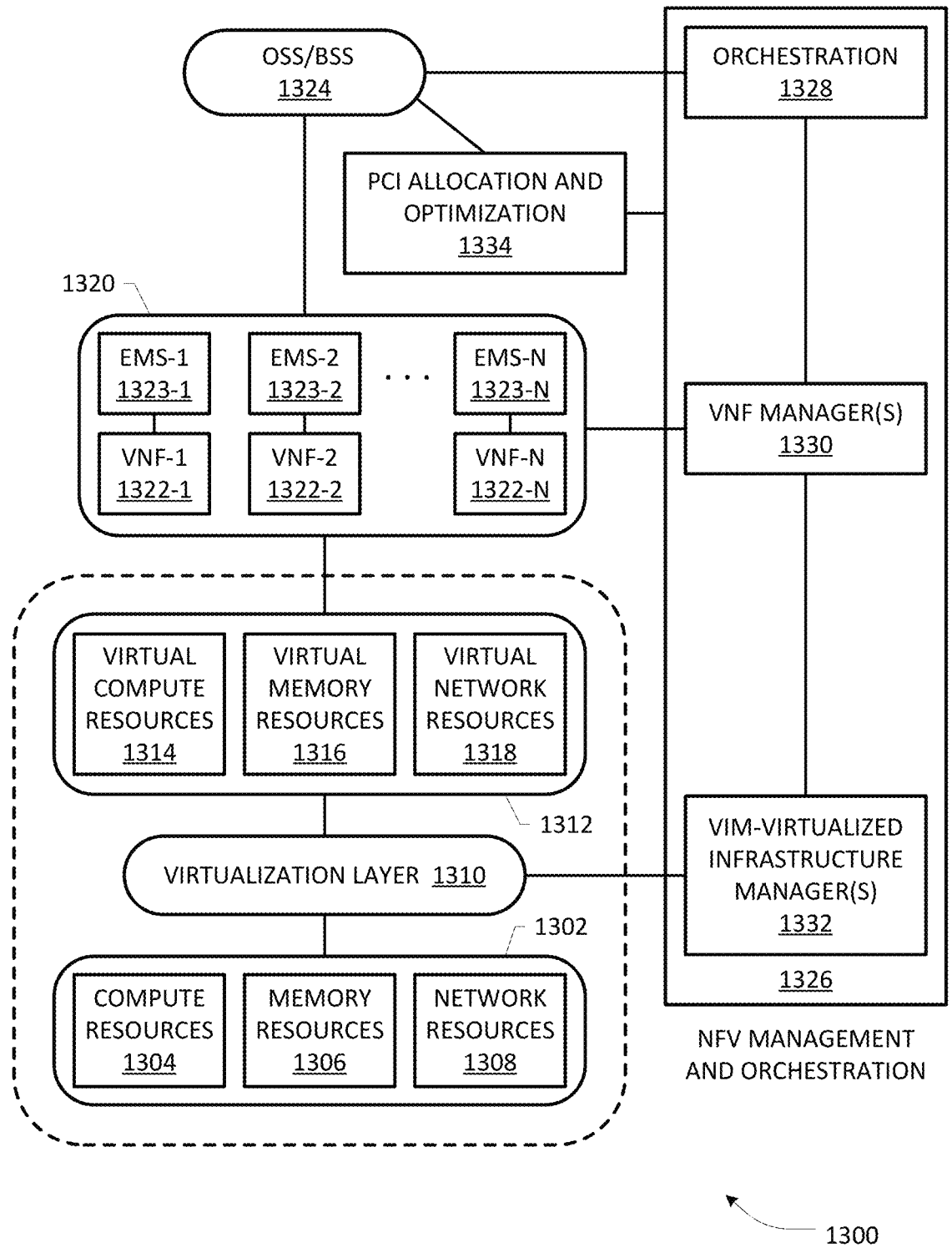
FIG. 13 depicts a network function virtualization (NFV) architecture that may be implemented in conjunction with an Operations Support System (OSS) of the present invention.

Turning to FIG. 13, depicted therein is a network function virtualization (NFV) architecture 1300 that may be applied in conjunction with an OSS of the present invention configured to allocate PCI groups to cell sites in a manner that minimizes or eliminates collisions in heterogeneous network environment such as the environment 100 set forth in FIG. 1. Various physical resources and services executing thereon within the network environment 100 may be provided as virtual appliances wherein the resources and service functions are virtualized into suitable virtual network functions (VNFs) via a virtualization layer 1310. Resources 1302 comprising compute resources 1304, memory resources 1306, and network infrastructure resources 1308 are virtualized into corresponding virtual resources 1312 wherein virtual compute resources 1314, virtual memory resources 1316 and virtual network resources 1318 are collectively operative to support a VNF layer 1320 including a plurality of VNFs 1322-1 to 1322-N, which may be managed by respective element management systems (EMS) 1323-1 to 1323-N. Virtualization layer 1310 (also sometimes referred to as virtual machine monitor (VMM) or "hypervisor") together with the physical resources 1302 and virtual resources 1312 may be referred to as NFV infrastructure (NFVI) of a network environment. Overall NFV management and orchestration functionality 1326 may be supported by one or more virtualized infrastructure managers (VIMs) 1332, one or more VNF managers 1330 and an orchestrator 1328, wherein VIM 1332 and VNF managers 1330 are interfaced with NFVI layer and VNF layer, respectively. An OSS platform 1324 (which may be integrated or co-located with a Business Support System (BSS) in some arrangements) is responsible for network-level functionalities such as network management, fault management, configuration management, service management, and subscriber management, etc. In one arrangement, various OSS components of the OSS platform 1324 may interface with VNF layer 1320 and NFV orchestration 1328 via suitable interfaces. In addition, OSS/BSS 1324 may be interfaced with a PCI allocation and optimization module 1334 for facilitating the allocation and optimization of PCI within a network. Broadly, NFV orchestration 1328 involves generating, maintaining and tearing down of network services or service functions supported by corresponding VNFs, including creating end-to-end services over multiple VNFs in a network environment, (e.g., service chaining for various data flows from ingress nodes to egress nodes). Further, NFV orchestrator 1328 is also responsible for global resource management of NFVI resources, e.g., managing compute, storage and networking resources among multiple VIMs in the network.

Based on the foregoing, it should be appreciated that in the context of the present application, the PCI allocation and optimization functionality of an OSS platform such as OSS 1324 may also be configured to access suitable OSS components that may be mapped to different hierarchical information layers based on how the virtualized resources are organized in accordance with NFVI. It should be appreciated that because the physical resources allocated to a VNF are considered to be elastic and the VNFs can run on multiple physical infrastructure network nodes, there is a loose coupling between the VNFs and the physical infrastructure hardware nodes they exist on, which allows greater scalability and dynamic configurability of a virtualized network environment. Consequently, the databases provided with different OSS components (based on the different hierarchical layers to which they are mapped) may need to be dynamically reconfigured as the underlying topologies change.

Figure 14:
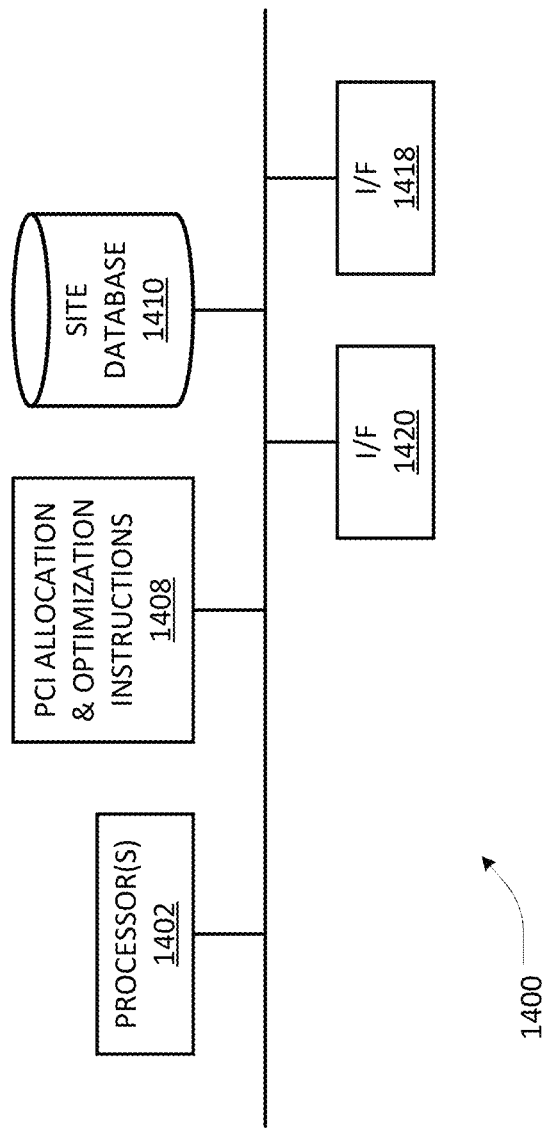
FIG. 14 depicts a block diagram of a computer-implemented platform or apparatus that may be (re)configured and/or (re)arranged as an OSS orchestrator or OSS component according to an embodiment of the present invention.

Turning to FIG. 14, depicted therein is a block diagram of a computer-implemented apparatus 1400 that may be (re) configured and/or (re)arranged as a platform, server, node or element to effectuate an example OSS orchestrator or an OSS component mapped to a specific hierarchical information layer, or a combination thereof, for PCI allocation and optimization according to an embodiment of the present patent disclosure. It should be appreciated that apparatus 1400 may be implemented as a distributed data center platform in some arrangements. One or more processors 1402 may be operatively coupled to various modules that may be implemented in persistent memory for executing suitable program instructions or code portions with respect to effectuating various aspects of PCI allocation and optimization as exemplified by PCI allocation and optimization instructions 1408 and site database 1410. Depending on the implementation, appropriate "upstream" interfaces (I/F) 1418 and/or "downstream" I/Fs 1420 may be provided for interfacing with external nodes (e.g., BSS nodes) and/or other OSS components, etc. Accordingly, depending on the context, interfaces selected from interfaces 1418, 1420 may sometimes be referred to as a first interface, a second interface, and so on FIGS. 15A/15B illustrate connectivity between network devices (NDs) within an exemplary network, as well as three exemplary implementations of the NDs, according to some embodiments of the invention wherein at least a portion of a heterogeneous hierarchical network environment and/or associated OSS nodes/components shown in some of the Figures previously discussed may be implemented in a virtualized environment. In particular, FIG. 15A shows NDs 1500A-H, which may be representative of various servers, database nodes, OSS components, external storage nodes, as well as other network elements of a network environment, and the like, wherein example connectivity is illustrated by way of lines between A-B, B-C, C-D, D-E, E-F, F-G, and A-G, as well as between H and each of A, C, D, and G. As noted elsewhere in the patent application, such NDs may be provided as physical devices, and the connectivity between these NDs can be wireless or wired (often referred to as a link). An additional line extending from NDs 1500A, E, and F illustrates that these NDs may act as ingress and egress nodes for the network (and thus, these NDs are sometimes referred to as edge NDs; while the other NDs may be called core NDs).

Two of the exemplary ND implementations in FIG. 15A are: (1) a special-purpose network device 1502 that uses custom application-specific integrated-circuits (ASICs) and a proprietary operating system (OS); and (2) a general purpose network device 1504 that uses common off-the-shelf (COTS) processors and a standard OS.

The special-purpose network device 1502 includes appropriate hardware 1510 (e.g., custom or application-specific hardware) comprising compute resource(s) 1512 (which typically include a set of one or more processors), forwarding resource(s) 1514 (which typically include one or more ASICs and/or network processors), and physical network interfaces (NIs) 1516 (sometimes called physical ports), as well as non-transitory machine readable storage media 1518 having stored therein suitable application-specific software or program instructions 1520 (e.g., PCI allocation and optimization 1521, etc.). A physical NI is a piece of hardware in an ND through which a network connection (e.g., wirelessly through a wireless network interface controller (WNIC) or through plugging in a cable to a physical port connected to a network interface controller (NIC)) is made, such as those shown by the connectivity between NDs 1500A-H. During operation, the application software 1520 may be executed by the hardware 1510 to instantiate a set of one or more application-specific or custom software instance(s) 1522. Each of the custom software instance(s) 1522, and that part of the hardware 1510 that executes that application software instance (be it hardware dedicated to that application software instance and/or time slices of hardware temporally shared by that application software instance with others of the application software instance(s) 1522), form a separate virtual network element 1530A-R. Each of the virtual network element(s) (VNEs) 1530A-R includes a control communication and configuration module 1532A-R (sometimes referred to as a local control module or control communication module) and forwarding table(s) 1534A-R with respect to suitable application/service instances 1533A-R, such that a given virtual network element (e.g., 1530A) includes the control communication and configuration module (e.g., 1532A), a set of one or more forwarding table(s) (e.g., 1534A), and that portion of the application hardware 1510 that executes the virtual network element (e.g., 1530A) for supporting the application instance 633A (e.g., collecting RAN data, performing initial PCI allocations, optimizing PCI allocations, and the like in relation to a PCI allocation subsystem virtualization).

Software 1520 can include code such as PCI allocation and optimization module 1521, which when executed by networking hardware 1510, causes the special-purpose network device 1502 to perform operations of one or more embodiments of the present invention as part of networking software instances 1522.

In an example implementation, the special-purpose network device 1502 is often physically and/or logically considered to include: (1) a ND control plane 1524 (sometimes referred to as a control plane) comprising the compute resource(s) 1512 that execute the control communication and configuration module(s) 1532A-R; and (2) a ND forwarding plane 1526 (sometimes referred to as a forwarding plane, a data plane, or a bearer plane) comprising the forwarding resource(s) 1514 that utilize the forwarding or destination table(s) 1534A-R and the physical NIs 1516. By way of example, where the ND is a virtual OSS node, the ND control plane 1524 (the compute resource(s) 1512 executing the control communication and configuration module(s) 1532A-R) is typically responsible for participating in determining the allocation and optimization of PCI to radio access nodes. Likewise, ND forwarding plane 1526 is responsible for receiving that data on the physical NIs 1516 (e.g., similar to I/Fs 1418 and 1420 in FIG. 14) and forwarding that data out the appropriate ones of the physical NIs 1516 based on the forwarding information.

FIG. 15B illustrates an exemplary way to implement the special-purpose network device 1502 according to some embodiments of the invention, wherein an example special-purpose network device includes one or more cards 1538 (typically hot pluggable) coupled to an interconnect mechanism. While in some embodiments the cards 1538 are of two types (one or more that operate as the ND forwarding plane 1526 (sometimes called line cards), and one or more that operate to implement the ND control plane 1524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway), etc.). By way of example, a service card may be used to terminate IPsec tunnels and execute the attendant authentication and encryption algorithms. These cards may be coupled together through one or more interconnect mechanisms illustrated as backplane 1536 (e.g., a first full mesh coupling the line cards and a second full mesh coupling all of the cards).

Returning to FIG. 15A, an example embodiment of the general purpose network device 1504 includes hardware 1540 comprising a set of one or more processor(s) 1542 (which are often COTS processors) and network interface controller(s) 1544 (NICs; also known as network interface cards) (which include physical NIs 1546), as well as non-transitory machine readable storage media 1548 having stored therein software 1550. During operation, the processor(s) 1542 execute the software 1550 to instantiate one or more sets of one or more applications 1564A-R with respect to facilitating OSS functionalities. While one embodiment does not implement virtualization, alternative embodiments may use different forms of virtualization—represented by a virtualization layer 1554 and software containers 1562A-R. For example, one such alternative embodiment implements operating system-level virtualization, in which case the virtualization layer 1554 represents the kernel of an operating system (or a shim executing on a base operating system) that allows for the creation of multiple software containers 1562A-R that may each be used to execute one of the sets of applications 1564A-R. In this embodiment, the multiple software containers 1562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1554 represents a hypervisor (sometimes referred to as a virtual machine monitor (VMM) as noted elsewhere in the present patent application) or a hypervisor executing on top of a host operating system; and (2) the software containers 1562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide paravirtualization which allows an operating system or application to be aware of the presence of virtualization for optimization purposes.

The instantiation of the one or more sets of one or more applications 1564A-R, as well as the virtualization layer 1554 and software containers 1562A-R if implemented are collectively referred to as software instance(s) 1552. Each set of applications 1564A-R, corresponding software container 1562A-R if implemented, and that part of the hardware 1540 that executes them (be it hardware dedicated to that execution and/or time slices of hardware temporally shared by software containers 1562A-R), forms a separate virtual network element(s) 1560A-R.

The virtual network element(s) 1560A-R perform similar functionality to the virtual network element(s) 1530A-R—e.g., similar to the control communication and configuration module(s) 1532A and forwarding table(s) 1534A (this virtualization of the hardware 1540 is sometimes referred to as Network Function Virtualization (NFV) architecture. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 1562A-R differently. For example, while embodiments of the invention may be practiced in an arrangement wherein each software container 1562A-R corresponds to one VNE 1560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1562A-R to VNEs also apply to embodiments where such a finer level of granularity is used.

In certain embodiments, the virtualization layer 1554 includes a virtual switch that provides similar forwarding services as a physical Ethernet switch. Specifically, this virtual switch forwards traffic between software containers 1562A-R and the NIC(s) 1544, as well as optionally between the software containers 1562A-R. In addition, this virtual switch may enforce network isolation between the VNEs 1560A-R that by policy are not permitted to communicate with each other (e.g., by honoring virtual local area networks (VLANs)).

Software 1550 can include code such as PCI allocation and optimization 1553, which when executed by networking hardware 1540, causes the general-purpose network device

1504 to perform operations of one or more embodiments of the present invention as part of software instances 1553.

The third exemplary ND implementation in FIG. 15A is a hybrid network device 1506, which may include both custom ASICs/proprietary OS and COTS processors/standard OS in a single ND or a single card within an ND. In certain embodiments of such a hybrid network device, a platform VM (i.e., a VM that implements the functionality of the special-purpose network device 1502) could provide for para-virtualization to the application-specific hardware present in the hybrid network device 1506 for effectuating one or more components, blocks, modules, and functionalities of an OSS platform.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1530A-R, VNEs 1560A-R, and those in the hybrid network device 1506) receives data on the physical NIs (e.g., 1516, 1546) and forwards that data out the appropriate ones of the physical NIs (e.g., 1516, 1546).

Accordingly, various hardware and software blocks configured for effectuating an example OSS including PCI allocation and optimization functionality may be embodied in NDs, NEs, NFs, VNE/VNF/VND, virtual appliances, virtual machines, and the like, as well as electronic devices and machine-readable media, which may be configured as any of the apparatuses described herein. One skilled in the art will therefore recognize that various apparatuses and systems with respect to the foregoing embodiments, as well as the underlying network infrastructures set forth above may be architected in a virtualized environment according to a suitable NFV architecture in additional or alternative embodiments of the present patent disclosure as noted above in reference to FIG. 15. Accordingly, for purposes of at least one embodiment of the present invention, the following detailed description may be additionally and/or alternatively provided, mutatis mutandis, in an example implementation with respect to the OSS components and/or the associated network elements of a hierarchical network environment.

Based on the foregoing Detailed Description, skilled artisans will appreciate that embodiments of the present invention advantageously overcome several deficiencies and shortcomings of the state of the art, including but not limited to the following. The disclosed method reduces the probability of PCI conflict that can result in poor downlink (DL) Signal to Noise Ratio (SINR) and poor user perception of throughput. Instances of conflict occurring in the network that may lead to a loss of connection are reduced or eliminated, which may provide higher throughput in the network, minimal dropped calls and an enhanced end customer experience.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense unless expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added or inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method operating at a management node for automatic physical cell ID (PCI) allocation to a plurality of cell sites in a radio access network (RAN), the method comprising:
    identifying a selected cell site of the plurality of cell sites, the selected cell site to be allocated a PCI group;
    from a group of cell sites in the RAN that have already been assigned a respective PCI group, identifying, for each PCI group, a closest neighbor site assigned to the respective PCI group and providing, for the closest neighbor site a respective distance from the selected cell site, a respective tier relationship to the selected cell site, and respective relative bearings between the selected cell site and the respective closest neighbor site;
    determining whether any of the respective closest neighbor sites meets a first criterion of having a respective distance greater than a cluster distance and allocating the respective PCI group of a first respective closest neighbor site that meets the first criterion to the selected cell site; and
    if none of the respective closest neighbor sites meet the first criterion, determining whether any of the respective closest neighbor sites meet a second criterion of a lack of coverage overlap between any respective sectors of the selected cell site and respective sectors of the respective closest neighbor site and if the second criterion is met, allocating the respective PCI group of the respective closest neighbor site that meets the second criterion to the selected cell site in order to improve throughput in the RAN and decrease the possibility of dropped calls.

2. The method as recited in claim 1 further comprising if none of the respective closest neighbor sites meet either the first criterion or the second criterion, determining whether any of the respective closest neighbor sites meets a third criterion of having a tier relationship to the selected cell site that is two or greater and the respective distance from the selected cell site is greater than an average cell footprint and if the third criterion is met, allocating the PCI group of the respective closest neighbor site that meets the third criterion to the selected cell site.

3. The method as recited in claim 2 further comprising if none of the respective closest neighbor sites meet any of the first, second and third criteria, determining whether any of the respective closest neighbor sites meets a fourth criterion of not having any sectors that face any sector of the selected cell site and if the fourth criterion is met, allocating the PCI group of the respective closest neighbor site that meets the fourth criterion to the selected cell site and otherwise allocating to the selected cell site the PCI group of the respective closest neighbor site that has the largest respective distance from the selected cell site.

4. The method as recited in claim 3 further comprising, when multiple respective closest neighbor sites meet one of the first, second, third and fourth criteria, allocating to the selected cell site the PCI group of a one of the multiple respective closest neighbor sites that has the largest respective distance from the selected cell site.

5. The method as recited in claim 4 further comprising:
    after all cell sites in the RAN have been allocated the respective PCI group, identifying a conflict between a first cell site and a second cell site;
    identifying a plurality of first cell neighbor sites wherein a respective first cell neighbor site does not share a location with the first cell site and the PCI group of the respective first cell neighbor site is not the same as the PCI group of the first cell site;
    from the plurality of first cell neighbor sites, eliminating first cell neighbor sites that have coverage overlap with the first cell site, wherein if more than one of the plurality of first cell neighbor sites remain, the closest of the first cell neighbor sites that remain is identified to be the selected first cell neighbor site;
    determining whether a new conflict is created if the PCI group of the first cell site is allocated as the PCI group of the selected first cell neighbor site and the PCI group of the selected first cell neighbor site is allocated as the PCI group of the first cell site; and if no new conflict is created, exchanging the PCI group of the first cell site and the PCI group of the selected first cell neighbor site.

6. The method as recited in claim 5 further comprising, if new conflict is created, determining whether another of the plurality of first cell neighbor sites remains to be tested.

7. The method as recited in claim 5 further comprising, if new conflict is created:

identifying a plurality of second cell neighbor sites wherein a respective second cell neighbor site and the second cell site do not share a location and the PCI group of the respective second cell neighbor site is not the same as the PCI group of the second cell site;

from the plurality of second cell neighbor sites, eliminating second cell neighbor sites that have coverage overlap with the second cell site, wherein if more than one of the plurality of second cell neighbor sites remain, the closest of the second cell neighbor sites that remains is identified to be the selected second cell neighbor site;

determining whether a new conflict is created if the PCI group of the second cell site is allocated as the PCI group of the selected second cell neighbor site and if the PCI group of the selected second cell neighbor site is allocated as the PCI group of the second cell site; and if no new conflict is created, exchanging the allocated PCI group of the second cell site and the PCI group of the selected second cell neighbor site.

8. The method as recited in claim 1 further comprising, for a system having n PCI groups, allocating the first n PCI groups respectively to a first n sites of the RAN.

9. A non-transitory machine-readable storage medium having program instructions thereon, which are configured to perform acts that when executed by one or more processors associated with a network, perform allocation and optimization of physical cell ID (PCI) groups to cell sites in a radio access node (RAN) using an iterative method that determines, for each given cell site in turn, a group comprising a closest neighbor cell site corresponding to each of a plurality of PCI groups that can be allocated to the given cell site, the iterative method determining whether any of the group of closest neighbor cell sites meet one of the criteria selected from a group of criteria comprising the respective closest neighbor cell site (a) is farther from the given cell site than a cluster distance, (b) does not have any coverage overlap with the given cell site, (c) has a tier relationship with the given cell site that is two or greater and is also farther from the given cell site than an average cell footprint, and (d) does not have any sectors that face any sectors of the given cell site, the iterative method allocating to the given cell site a respective PCI group of a first selected closest neighbor cell site that meets a first criterion and if no closest neighbor cell site meets any of the criteria, allocating to the given cell site a respective PCI group of a second closest neighbor cell site that is farthest from the given cell site.

10. The non-transitory machine-readable storage medium as recited in claim 9 wherein the program instructions further comprise that if two or more or the respective closest neighbor cell sites meet the first criterion, selecting among the two or more closest neighbor cell site the respective closest neighbor cell site that has the greatest distance from the given cell site.

11. The non-transitory machine-readable storage medium as recited in claim 9 wherein the program instructions further comprise, after all cell sites in the RAN have been allocated the respective PCI group:

identifying a conflict between a first cell site and a second cell site; selecting a first neighboring cell site of the first cell site that does not share a location with the first cell site, does not share a PCI group with the first cell site, and does not have coverage overlap with the first cell site;

determining whether a new conflict is created by exchanging a first PCI group associated with the first cell site and a second PCI group associated with the first neighboring cell site; and if no new conflict is created by the exchange, exchanging the allocation of the first PCI group with the allocation of the second PCI group.

12. The non-transitory machine-readable storage medium as recited in claim 11 wherein the program instructions further comprise, if the conflict has not been resolved:

selecting a second neighboring cell site of the second cell site that does not share a location with the second cell site, does not share a PCI group with the second cell site, and does not have coverage overlap with the second cell site;

determining whether a new conflict is created by exchanging a third PCI group associated with the second cell site and a fourth PCI group associated with the second neighboring cell site; and if no new conflict is created by the exchange, exchanging the assignment of the third PCI group with the assignment of the fourth PCI group.

13. A User Equipment (UE) comprising:
a processor;
a transceiver coupled to the processor; and
a memory that comprises a cell synchronization module, a reference signal location module and a communications module that when collectively performed by the processor, receive a physical downlink shared channel from a given cell site, determine a physical cell ID (PCI) from the physical downlink shared channel and utilizes the PCI to determine the location of reference signals utilized in cell selection, cell reselection and handover procedures, wherein allocation and optimization of the PCI has been performed using an iterative method that determines a group comprising a closest neighbor cell site for each of a plurality of PCI groups that can be allocated to the given cell site, the iterative method determining whether any of the group of closest neighbor cell sites meet one of the criteria comprising the closest neighbor cell site (a) is farther from the given cell site than a cluster distance, (b) does not have any coverage overlap with the given cell site, (c) has a tier relationship with the given cell site that is two or greater and is also farther from the given cell site than an average cell footprint, and (d) does not have any sectors that face any sectors of the given cell site, the iterative method allocating to the given cell site a respective PCI group of the closest neighbor cell site that meets a first criterion and if no closest neighbor cell site meets any of the criteria, allocating to the given cell site a respective PCI group of the closest neighbor cell site that is farthest from the given cell site.

14. An apparatus configured as a network node for automatic physical cell ID (PCI) allocation to a plurality of cell sites in a radio access network (RAN), the apparatus comprising:

one or more processors;
one or more persistent memory modules coupled to the one or more processors and having program instructions stored thereon which, when executed by the one or more processors, perform the following:

identifying a selected cell site of the plurality of cell sites, the selected cell site to be allocated a PCI group;

from a group of cell sites in the RAN that have already been allocated a respective PCI group, identifying, for each PCI group, a closest neighbor site allocated to the respective PCI group and providing, for the closest neighbor site a respective distance from the selected cell site, a respective tier relationship to the selected cell site, and respective relative bearings between the selected cell site and the respective closest neighbor site;

determining whether any of the respective closest neighbor sites meets a first criterion of having a respective distance greater than a cluster distance and allocating the respective PCI group of a first respective closest neighbor site that meets the first criterion to the selected cell site; and if none of the respective closest neighbor sites meet the first criterion, determining whether any of the respective closest neighbor sites meet a second criterion of a lack of coverage overlap between any respective sectors of the selected cell site and respective sectors of the respective closest neighbor site and if the second criterion is met, allocating the respective PCI group of the respective closest neighbor site that meets the second criterion to the selected cell site in order to improve throughput in the RAN and decrease the possibility of dropped calls.

15. The apparatus configured as a network node as recited in claim 14 wherein the program instructions, when executed by the one or more processors further perform the following: if none of the respective closest neighbor sites meet either the first criterion or the second criterion, determining whether any of the respective closest neighbor sites meet a third criterion of having a tier relationship to the selected cell site that is two or greater and the respective distance from the selected cell site is greater than an average cell footprint and if the third criterion is met, allocating the PCI group of the respective closest neighbor site that meets the third criterion to the selected cell site.

16. The apparatus configured as a network node as recited in claim 15 wherein the program instructions, when executed by the one or more processors further perform the following: if none of the respective closest neighbor sites meet any of the first, second and third criteria, determining whether any of the respective closest neighbor sites meets a fourth criterion of not having any sectors that face any sector of the selected cell site and if the fourth criterion is met, allocating the PCI group of the respective closest neighbor site that meets the fourth criterion to the selected cell site and otherwise allocating to the selected cell site the PCI group of the respective closest neighbor site that has the largest respective distance from the selected cell site.

17. The apparatus configured as a network node as recited in claim 16 wherein the program instructions, when executed by the one or more processors further perform the following: when multiple respective closest neighbor sites meet one of the first, second, third and fourth criteria, allocating to the selected cell site the PCI group of a one of the multiple respective closest neighbor sites that has the largest respective distance from the selected cell site.

18. The apparatus configured as a network node as recited in claim 17 wherein the program instructions, when executed by the one or more processors further perform the following:

after all cell sites in the RAN have been allocated the respective PCI group, identify a conflict between a first cell site and a second cell site;

identify a plurality of first cell neighbor sites wherein a respective first cell neighbor site does not share a location with the first cell site and the PCI group of the respective first cell neighbor site is not the same as the PCI group of the first cell site;

from the plurality of first cell neighbor sites, eliminating first cell neighbor sites that have coverage overlap with the first cell site, wherein if more than one of the plurality of first cell neighbor sites remain, the closest of the first cell neighbor sites that remains is identified to be the selected first cell neighbor site;

determining whether a new conflict is created if the PCI group of the first cell site is allocated as the PCI group of the selected first cell neighbor site and the PCI group of the selected first cell neighbor site is allocated as the PCI group of the first cell site; and if no new conflict is created, initiate exchanging of the PCI group of the first cell site and the PCI group of the selected first cell neighbor site.

19. The apparatus configured as a network node as recited in claim 18 wherein the program instructions, when executed by the one or more processors further perform the following if new conflict is created:

identify a plurality of second cell neighbor sites wherein a respective second cell neighbor site and the second cell site do not share a location and the PCI group of the respective second cell neighbor site is not the same as the PCI group of the second cell site;

from the plurality of second cell neighbor sites, eliminate selected second cell neighbor sites that have coverage overlap with the second cell site, wherein if more than one of the plurality of second cell neighbor sites remain, the closest of the second cell neighbor sites that remains is identified to be the selected second cell neighbor site;

determining whether a new conflict is created if the PCI group of the second cell site is allocated as the PCI group of the selected second cell neighbor site and the PCI group of the selected second cell neighbor site is allocated as the PCI group of the second cell site; and if no new conflict is created, initiate exchanging of the PCI group of the second cell site and the PCI group of the selected second cell neighbor site.

20. The apparatus configured as a network node as recited in claim 14 wherein the program instructions, when executed by the one or more processors further perform the following: for a system having n PCI groups, allocating the first n PCI groups respectively to a first n sites of the RAN.

21. The apparatus configured as a network node as recited in claim 14 wherein the apparatus configured as a network node comprises one of an Operations Support System (OSS) node, a data center node, a virtual client node, and a services platform node.

* * * * *